(12) United States Patent
Pei

(10) Patent No.: US 11,870,293 B2
(45) Date of Patent: Jan. 9, 2024

(54) WIRELESS CHARGING RECEIVER CIRCUIT, CONTROL METHOD, AND TERMINAL DEVICE

(71) Applicant: HUAWEI TECHNOLOGIES CO., LTD., Guangdong (CN)

(72) Inventor: Changsheng Pei, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 429 days.

(21) Appl. No.: 17/213,591

(22) Filed: Mar. 26, 2021

(65) Prior Publication Data

US 2021/0218264 A1 Jul. 15, 2021

Related U.S. Application Data

(63) Continuation of application No. PCT/CN2019/090428, filed on Jun. 6, 2019.

(30) Foreign Application Priority Data

Sep. 30, 2018 (CN) .......................... 201811161343.0

(51) Int. Cl.
*H02J 7/02* (2016.01)
*H02J 50/12* (2016.01)
*H04M 1/725* (2021.01)

(52) U.S. Cl.
CPC ................ *H02J 7/02* (2013.01); *H02J 50/12* (2016.02); *H02J 2207/20* (2020.01); *H04M 1/725* (2013.01)

(58) Field of Classification Search
CPC ........... H02J 7/02; H02J 50/12; H02J 2207/20
See application file for complete search history.

(56) References Cited

U.S. PATENT DOCUMENTS

| 2011/0234011 | A1 | 9/2011 | Yi et al. |
| 2014/0152117 | A1 | 6/2014 | Sankar |
| 2014/0246923 | A1 | 9/2014 | Riehl et al. |
| 2017/0229921 | A1 | 8/2017 | Hwang et al. |
| 2017/0346343 | A1 | 11/2017 | Atasoy et al. |
| 2018/0304755 | A1* | 10/2018 | Beaver .................... H02J 50/80 |

FOREIGN PATENT DOCUMENTS

| CN | 106558924 A | 4/2017 |
| CN | 107069983 A | 8/2017 |
| CN | 107408841 A | 11/2017 |
| CN | 108282030 A | 7/2018 |
| CN | 109462289 A | 3/2019 |
| EP | 2381556 A2 | 10/2011 |
| JP | 2013240265 A | 11/2013 |
| JP | 2016010170 A | 1/2016 |

(Continued)

*Primary Examiner* — Robert Grant
(74) *Attorney, Agent, or Firm* — WOMBLE BOND DICKINSON (US) LLP

(57) ABSTRACT

A wireless charging receiver circuit, a control method, and a terminal device are disclosed, to compensate for, to some extent, decreases in an output voltage and an output power of the wireless charging receiver circuit due to a great increase in a transmission distance between a secondary coil in the wireless charging receiver circuit and a primary coil in a corresponding wireless charging transmitter circuit.

20 Claims, 15 Drawing Sheets

(56) References Cited

FOREIGN PATENT DOCUMENTS

| JP | 2017212858 A | 11/2017 |
|----|--------------|---------|
| KR | 20110108598 A | 10/2011 |
| KR | 20160017560 A | 2/2016 |
| WO | 2014052686 A2 | 4/2014 |
| WO | 2014103430 A1 | 7/2014 |

* cited by examiner

WIRELESS CHARGING RECEIVER CIRCUIT, CONTROL METHOD, AND TERMINAL DEVICE

CROSS-REFERENCE TO RELATED APPLICATIONS

This application is a continuation of International Application No. PCT/CN2019/090428 filed on Jun. 6, 2019, which claims priority to Chinese Patent Application No. 201811161343.0 filed on Sep. 30, 2018. The disclosures of the aforementioned applications are hereby incorporated by reference in their entireties.

TECHNICAL FIELD

This application relates to the wireless charging field, and in particular, to a wireless charging receiver circuit, a control method, and a terminal device.

BACKGROUND

FIG. 1 is a schematic principle diagram of a wireless charging system. The wireless charging system includes a wireless charging transmitter circuit 101 and a wireless charging receiver circuit 102. In an embodiment, energy may be wirelessly transmitted between the wireless charging transmitter circuit 101 and the wireless charging receiver circuit 102 through magnetic induction. For example, the wireless charging transmitter circuit 101 includes an alternating current power supply Vs, a primary series resonant capacitor Cp, and a primary coil Lp; and the wireless charging receiver circuit 102 includes a secondary coil Ls, a secondary series resonant capacitor Cs, and a rectifier circuit 1021. The alternating current power supply Vs outputs an alternating current having a particular frequency. The primary series resonant capacitor Cp and the primary coil Lp generate a series resonance, to generate an alternating current having a specific frequency. In this case, energy is wirelessly transmitted to the wireless charging receiver circuit 102 through magnetic induction between the primary coil Lp and the secondary coil Ls. The secondary coil Ls and the secondary series resonant capacitor Cs generate a series resonance, to generate an alternating current having an operating frequency. The rectifier circuit 1021 converts the input alternating current having the operating frequency into a direct current, to drive a load RL.

Coupling efficiency between the primary coil Lp and the secondary coil Ls is related to a transmission distance between the primary coil Lp and the secondary coil Ls. When the transmission distance between the primary coil Lp and the secondary coil Ls is increased, the coupling efficiency between the primary coil Lp and the secondary coil Ls is reduced, and consequently, an output voltage and an output power of the rectifier circuit 1021 are decreased.

In the prior art, a manner of increasing the output voltage and the output power of the rectifier circuit on the side of the wireless charging receiver circuit 102 is as follows: An alternating current frequency output on the side of the wireless charging transmitter circuit 101 is decreased, so that an operating frequency of an alternating current input to the rectifier circuit on the side of the wireless charging receiver circuit 102 is decreased. This compensates for decreases in the output voltage and the output power on the side of the wireless charging receiver circuit 102 due to an increase in the transmission distance. However, for the wireless charging system using a wireless power consortium (wireless power consortium, WPC) protocol, the alternating current frequency on the side of the wireless charging transmitter circuit 101 has a limited adjustment range. When the transmission distance between the primary coil Lp and the secondary coil Ls is relatively large, the operating frequency of the alternating current input to the rectifier circuit on the side of the wireless charging receiver circuit 102 also has a limited adjustment range. Consequently, the output voltage and the output power of the rectifier circuit on the side of the wireless charging receiver circuit 102 also have limited adjustment ranges.

SUMMARY

This application provides a wireless charging receiver circuit, to adjust, to some extent, an operating frequency of an alternating current input to a rectifier circuit on a side of a wireless charging receiver circuit when a transmission distance between a secondary coil in the wireless charging receiver circuit and a primary coil in a corresponding wireless charging transmitter circuit is relatively large.

In addition, this application further provides a control method for controlling the wireless charging receiver circuit and a terminal device that uses the wireless charging receiver circuit.

To achieve the foregoing objective, the following technical solutions are used in embodiments of this application.

According to a first aspect, an embodiment of this application provides a wireless charging receiver circuit, including N capacitor-switch networks, a rectifier circuit, and a controller, where N is an integer greater than or equal to 1. A first end of each capacitor-switch network is connected to a first input end of the rectifier circuit, and a second end of each capacitor-switch network is connected to a second input end of the rectifier circuit. Each capacitor-switch network includes a first capacitor, a second capacitor, a first controllable switch device, a second controllable switch device, and a ground point. The first capacitor located on one side of the ground point is connected in series to the first controllable switch device, and the second capacitor located on the other side of the ground point is connected in series to the second controllable switch device. In a same capacitor-switch network, a capacitance value of a first capacitor is equal to or substantially equal to a capacitance value of a second capacitor.

The controller includes N output ends. The N output ends one-to-one correspond to the N capacitor-switch networks, and each output end is configured to be connected to a control end of a first controllable switch device in a corresponding capacitor-switch network and a control end of a second controllable switch device in the corresponding capacitor-switch network.

The controller is configured to obtain an operating frequency of an alternating-current voltage between the first input end and the second input end of the rectifier circuit.

When the operating frequency is less than a first frequency threshold, and a total value of capacitance values of capacitors that are in the N capacitor-switch networks and that are connected to the wireless charging receiver circuit are less than a preset capacitance threshold, the controller is further configured to adjust an output level at each output end, to control the first controllable switch device and the second controllable switch device in each capacitor-switch network to be closed or opened, to increase the total value of the capacitance values of the capacitors that are in the N capacitor-switch networks and that are connected to the wireless charging receiver circuit.

When the operating frequency is greater than a second frequency threshold, the controller is further configured to adjust an output level at each output end, to control the first controllable switch device and the second controllable switch device in each capacitor-switch network to be closed or opened, to decrease a total value of capacitance values of capacitors that are in the N capacitor-switch networks and that are connected to the wireless charging receiver circuit.

The first frequency threshold is less than or equal to the second frequency threshold.

It should be noted that the first capacitor, the second capacitor, the first controllable switch device, and the second controllable switch device that are in each capacitor-switch network are connected in series.

In an embodiment, one end of the first capacitor is connected to the first input end of the rectifier circuit, the other end of the first capacitor is connected to one end of the first controllable switch device, the other end of the first controllable switch device is connected to one end of the second controllable switch device, the other end of the second controllable switch device is connected to one end of the second capacitor, and the other end of the second capacitor is connected to the second input end of the rectifier circuit. In this case, the ground point is located between the other end of the first controllable switch device and the one end of the second controllable switch device.

In an embodiment, one end of the first capacitor is connected to the first input end of the rectifier circuit, the other end of the first capacitor is connected to one end of the first controllable switch device, the other end of the first controllable switch device is connected to one end of the second capacitor, the other end of the second capacitor is connected to one end of the second controllable switch device, and the other end of the second controllable switch device is connected to the second input end of the rectifier circuit. In this case, the ground point is located between the other end of the first controllable switch device and the one end of the second capacitor.

In an embodiment, one end of the first controllable switch device is connected to the first input end of the rectifier circuit, the other end of the first controllable switch device is connected to one end of the first capacitor, the other end of the first capacitor is connected to one end of the second capacitor, the other end of the second capacitor is connected to one end of the second controllable switch device, and the other end of the second controllable switch device is connected to the second input end of the rectifier circuit. In this case, the ground point is located between the other end of the first capacitor and the one end of the second capacitor.

In an embodiment, one end of the first controllable switch device is connected to the first input end of the rectifier circuit, the other end of the first controllable switch device is connected to one end of the first capacitor, the other end of the first capacitor is connected to one end of the second controllable switch device, the other end of the second controllable switch device is connected to one end of the second capacitor, and the other end of the second capacitor is connected to the second input end of the rectifier circuit. In this case, the ground point is located between the other end of the first capacitor and the one end of the second controllable switch device.

In the wireless charging receiver circuit provided in this embodiment of this application, the N capacitor-switch networks are connected in parallel, and the controller controls the first controllable switch device and the second controllable switch device in each capacitor-switch network to be closed or opened, to control the total value of the capacitance values of the capacitors that are in the N capacitor-switch networks and that are connected to the wireless charging receiver circuit. Further, when the operating frequency of the alternating-current voltage input between the first input end and the second input end of the rectifier circuit is less than the first frequency threshold, the total value of the capacitance values of the capacitors that are in the N capacitor-switch networks and that are connected to the wireless charging receiver circuit are controlled to be increased. When the operating frequency is greater than the second frequency threshold, the total value of the capacitance values of the capacitors that are in the N capacitor-switch networks and that are connected to the wireless charging receiver circuit are controlled to be decreased. In other words, the first controllable switch device and the second controllable switch device in each of the N capacitor-switch networks are controlled to be closed or opened. In this way, the total value of the capacitance values of the capacitors connected to the wireless charging receiver circuit can be increased or decreased, and an operating frequency of an alternating current input to the rectifier circuit on the side of the wireless charging receiver circuit can be adjusted. Therefore, this application provides a simple circuit structure for controlling the operating frequency of the alternating current input to the rectifier circuit.

In an embodiment, the controller is further configured to obtain a voltage and a current that are output by the rectifier circuit, and obtain an output power based on the voltage and the current. When the operating frequency is greater than or equal to the first frequency threshold and less than or equal to the second frequency threshold, the total value of the capacitance values of the capacitors that are in the N capacitor-switch networks and that are connected to the wireless charging receiver circuit are less than the preset capacitance threshold, and the output power is less than a preset power threshold, the controller is further configured to adjust an output level at each output end, to control the first controllable switch device and the second controllable switch device in each capacitor-switch network to be closed or opened, to increase the total value of the capacitance values of the capacitors that are in the N capacitor-switch networks and that are connected to the wireless charging receiver circuit.

In an embodiment, the first controllable switch device and the second controllable switch device in each of the N capacitor-switch networks may be controlled, based on the output power of the rectifier circuit and the operating frequency, to be closed or opened. In this way, the total value of the capacitance values of the capacitors connected to the wireless charging receiver circuit can be increased or decreased, and an operating frequency of an alternating current input to the rectifier circuit on the side of the wireless charging receiver circuit can be adjusted.

In an embodiment, a capacitance value of a first capacitor in an $(i+1)^{th}$ capacitor-switch network is K times a capacitance value of a first capacitor in an $i^{th}$ capacitor-switch network, where, i is an integer, $1 \leq i \leq N-1$, and $1 \leq K \leq 10$. This embodiment provides a manner of setting capacitance values of first capacitors and capacitance values of second capacitors in the N capacitor-switch networks.

In an embodiment, the circuit further includes a secondary coil and a secondary series resonant capacitor. A first end of the secondary coil is connected to a first end of the secondary series resonant capacitor, a second end of the secondary series resonant capacitor is connected to first ends of the N capacitor-switch networks and the first input end of the rectifier circuit, and a second end of the secondary coil is connected to second ends of the N capacitor-switch networks and the second input end of the rectifier circuit. The secondary coil is configured to be coupled to a primary coil of a wireless charging transmitter circuit. The secondary series resonant capacitor and the secondary coil generate a series resonance. The N capacitor-switch networks, the secondary series resonant capacitor, and the secondary coil generate a parallel resonance.

In an embodiment, the wireless charging receiver circuit further includes a first filter capacitor. A first end of the first filter capacitor is connected to a first output end of the rectifier circuit, and a second end of the first filter capacitor is connected to a second output end of the rectifier circuit. A direct current output by the rectifier circuit includes clutter. After the clutter is filtered out by the first filter capacitor, the direct current may be supplied to a load.

In an embodiment, the wireless charging receiver circuit further includes a direct-current/direct-current voltage step-down circuit. A first input end of the direct-current/direct-current voltage step-down circuit is connected to the first end of the first filter capacitor, a second input end of the direct-current/direct-current voltage step-down circuit is connected to the second end of the first filter capacitor, a first output end of the direct-current/direct-current voltage step-down circuit is connected to a first end of the load, and a second output end of the direct-current/direct-current voltage step-down circuit is connected to a second end of the load. The direct-current/direct-current voltage step-down circuit is configured to decrease a voltage between the two ends of the first filter capacitor, to increase equivalent load impedance. When the output power of the wireless charging receiver circuit is adjusted, the output voltage is required to remain stable. As described above, when a capacitance value of a parallel resonant capacitor is increased, the voltage output by the rectifier circuit is increased. In this case, the DC/DC voltage step-down circuit needs to be correspondingly adjusted, so that a voltage output by the DC/DC voltage step-down circuit 400 (namely, the wireless charging receiver circuit) is stable.

In an embodiment, the wireless charging receiver circuit further includes a first resistor and a second resistor. A first end of the first resistor is connected to the first output end of the rectifier circuit, a second end of the first resistor is connected to a first end of the second resistor, a second end of the second resistor is connected to the second output end of the rectifier circuit, and the first end of the second resistor is connected to a first input end of the controller. The first resistor and the second resistor are configured to measure the voltage output by the rectifier circuit. The voltage output by the rectifier circuit is usually relatively high and exceeds a withstand voltage at an input end of the controller. A voltage at a lead-out point is decreased to a value below the withstand voltage at the input end of the controller through voltage distribution to the first resistor and the second resistor.

In an embodiment, the wireless charging receiver circuit further includes a current sampling apparatus. The current sampling apparatus is located on a positive end or a ground end between the first filter capacitor and the direct-current/direct-current voltage step-down circuit. The current sampling apparatus is connected to a second input end of the controller, and configured to measure the current output by the rectifier circuit. The current sampling apparatus may be configured to measure the current output by the rectifier circuit.

In an embodiment, the wireless charging receiver circuit further includes a second filter capacitor. A first end of the second filter capacitor is connected between the first output end of the direct-current/direct-current voltage step-down circuit and the first end of the load, and a second end of the second filter capacitor is connected between the second output end of the direct-current/direct-current voltage step-down circuit and the second end of the load. The second filter capacitor is configured to filter a current output by the DC/DC voltage step-down circuit.

According to a second aspect, an embodiment of this application provides a control method. The method is applied to the wireless charging receiver circuit according to any one of the first aspect or the embodiments of the first aspect, and includes the following operations:

obtaining an operating frequency of an alternating-current voltage between a first input end and a second input end of a rectifier circuit; and when the operating frequency is less than a first frequency threshold, and a total value of capacitance values of capacitors that are in N capacitor-switch networks and that are connected to a wireless charging receiver circuit are less than a preset capacitance threshold, adjusting an output level at each output end, to control a first controllable switch device and a second controllable switch device in each capacitor-switch network to be closed or opened, to increase the total value of the capacitance values of the capacitors that are in the N capacitor-switch networks and that are connected to the wireless charging receiver circuit; or when the operating frequency is greater than a second frequency threshold, adjusting an output level at each output end, to control a first controllable switch device and a second controllable switch device in each capacitor-switch network to be closed or opened, to decrease a total value of capacitance values of capacitors that are in the N capacitor-switch networks and that are connected to the wireless charging receiver circuit.

The first frequency threshold is less than or equal to the second frequency threshold.

In an embodiment, the method may further include the following operations:

obtaining a voltage and a current that are output by the rectifier circuit, and obtaining an output power based on the voltage and the current; and when the operating frequency is greater than or equal to the first frequency threshold and less than or equal to the second frequency threshold, the total value of the capacitance values of the capacitors that are in the N capacitor-switch networks and that are connected to the wireless charging receiver circuit are less than the preset capacitance threshold, and the output power is less than a preset power threshold, adjusting an output level at each output end, to control a first controllable switch device and a second controllable switch device in each capacitor-switch network to be closed or opened, to increase the total value of the capacitance values of the capacitors that are in the N capacitor-switch networks and that are connected to the wireless charging receiver circuit.

According to a third aspect, an embodiment of this application provides a control apparatus. The control apparatus includes an obtaining unit and an adjustment unit. The obtaining unit is configured to obtain an operating frequency of an alternating-current voltage between a first input end and a second input end of a rectifier circuit. When the operating frequency is less than a first frequency threshold, and a total value of capacitance values of capacitors that are in N capacitor-switch networks and that are connected to a wireless charging receiver circuit are less than a preset capacitance threshold, the adjustment unit is configured to adjust an output level at each output end, to control a first controllable switch device and a second controllable switch device in each capacitor-switch network to be closed or opened, to increase the total value of the capacitance values of the capacitors that are in the N capacitor-switch networks and that are connected to the wireless charging receiver circuit.

When the operating frequency is greater than a second frequency threshold, the adjustment unit is further configured to adjust an output level at each output end, to control a first controllable switch device and a second controllable switch device in each capacitor-switch network to be closed or opened, to decrease a total value of capacitance values of capacitors that are in the N capacitor-switch networks and that are connected to the wireless charging receiver circuit. The first frequency threshold is less than or equal to the second frequency threshold.

In an embodiment, the obtaining unit is further configured to obtain a voltage and a current that are output by the rectifier circuit, and obtain an output power based on the voltage and the current. When the operating frequency is greater than or equal to the first frequency threshold and less than or equal to the second frequency threshold, the total value of the capacitance values of the capacitors that are in the N capacitor-switch networks and that are connected to the wireless charging receiver circuit are less than the preset capacitance threshold, and the output power is less than a preset power threshold, the adjustment unit is further configured to adjust an output level at each output end, to control a first controllable switch device and a second controllable switch device in each capacitor-switch network to be closed or opened, to increase the total value of the capacitance values of the capacitors that are in the N capacitor-switch networks and that are connected to the wireless charging receiver circuit.

According to a fourth aspect, an embodiment of this application provides a terminal device. The terminal device includes the wireless charging receiver circuit according to any one of the first aspect or the embodiments of the first aspect.

According to a fifth aspect, an embodiment of this application provides a storage medium. The storage medium stores a computer program. The computer program is executed by a processor, to implement the control method according to any one of the second aspect or the embodiments of the second aspect.

According to a sixth aspect, an embodiment of this application provides a control apparatus. The control apparatus is configured to perform the method according to any one of the second aspect or the embodiments of the second aspect.

According to a seventh aspect, an embodiment of this application provides a control apparatus. The control apparatus includes a processor and a memory. The memory is configured to store a program. The processor invokes the program stored in the memory, to perform the method according to any one of the second aspect or the embodiments of the second aspect.

According to an eighth aspect, an embodiment of this application provides a computer program product. When the computer program product runs on a control apparatus, the control apparatus is enabled to perform the method according to any one of the second aspect or the embodiments of the second aspect.

According to a ninth aspect, an embodiment of this application provides a chip system. The chip system includes a processor. The processor is configured to support a control apparatus to perform the method according to any one of the second aspect or the embodiments of the second aspect.

According to a tenth aspect, an embodiment of this application provides a wireless charging system. The wireless charging system includes a wireless charging transmitter circuit and the wireless charging receiver circuit according to any one of the first aspect or the embodiments of the first aspect. Energy is transmitted between the wireless charging receiver circuit and the wireless charging transmitter circuit through magnetic induction.

For technical effects achieved in the second aspect to the tenth aspect, refer to content described in the first aspect and the embodiments of the first aspect.

DESCRIPTION OF EMBODIMENTS

Figure 1:
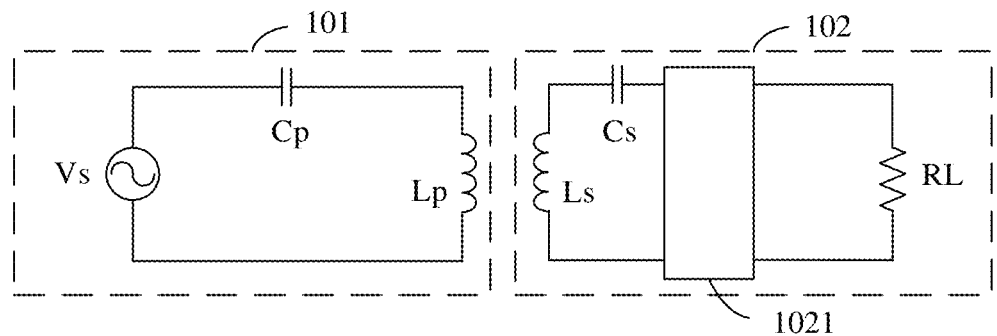
FIG. 1 is a schematic principle diagram of a wireless charging system.

FIG. 1 is a schematic principle diagram of a wireless charging system. As shown in FIG. 1, in a wireless charging transmitter circuit 101, a primary series resonant capacitor Cp and a primary coil Lp are connected in series; and in a wireless charging receiver circuit 102, a secondary coil Ls and a secondary series resonant capacitor Cs are connected in series. In the wireless charging system shown in FIG. 1, a transmission distance between the primary coil Lp and the secondary coil Ls is very short. As the transmission distance between the primary coil Lp and the secondary coil Ls is increased, an output power of the wireless charging receiver circuit 102 is rapidly decreased. Consequently, an anti-offset capability of the wireless charging receiver circuit 102 is poor.

Figure 2:
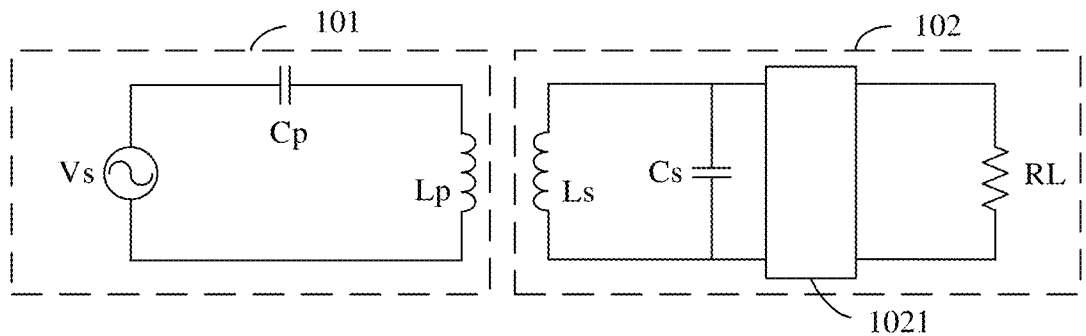
FIG. 2 is a schematic principle diagram of another wireless charging system.

FIG. 2 is a schematic principle diagram of another wireless charging system. As shown in FIG. 2, in a wireless charging transmitter circuit 101, a primary series resonant capacitor Cp and a primary coil Lp are connected in series; and in a wireless charging receiver circuit 102, a secondary coil Ls and a secondary series resonant capacitor Cs are connected in parallel. In the wireless charging system shown in FIG. 2, although an anti-offset capability of the wireless charging receiver circuit 102 is better than that of the wireless charging receiver circuit 102 shown in FIG. 1, in a parallel compensation manner, because an output voltage near a resonance point has a resonance peak and a voltage change rate of the resonance peak is relatively high, it is difficult to stably control an output voltage.

Figure 3:
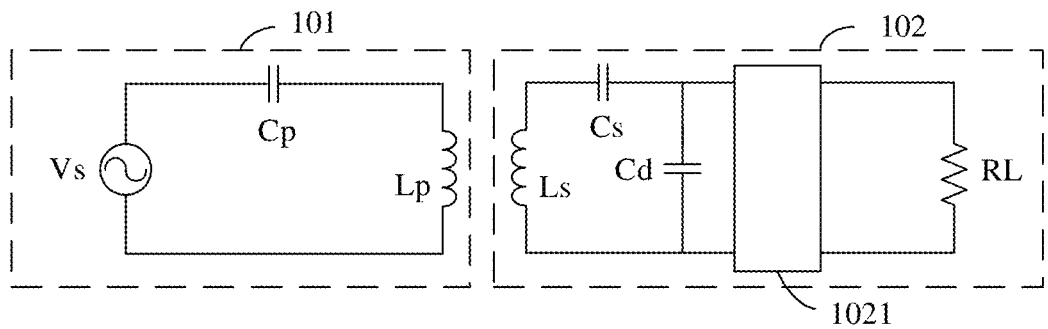
FIG. 3 is a schematic principle diagram of a wireless charging system according to an embodiment of this application.

As shown in FIG. 3, an embodiment of this application provides a wireless charging system, including a wireless charging transmitter circuit 101 and a wireless charging receiver circuit 102. Energy is transmitted between the wireless charging receiver circuit and the wireless charging transmitter circuit through magnetic induction. In this embodiment of this application, in the wireless charging transmitter circuit 101, a primary series resonant capacitor Cp and a primary coil Lp are connected in series; and in the wireless charging receiver circuit 102, a secondary coil Ls is connected in series to a secondary series resonant capacitor Cs and then connected in parallel to a parallel resonant capacitor Cd. When a transmission distance between the primary coil Lp of the wireless charging transmitter circuit 101 and the secondary coil Ls of the wireless charging receiver circuit 102 is increased, first, a manner in the prior art is used: An alternating current frequency output on the side of the wireless charging transmitter circuit 101 is decreased, to compensate for decreases in an output voltage and an output power on the side of the wireless charging receiver circuit 102 due to an increase in the transmission distance. When the alternating current frequency output on the side of the wireless charging transmitter circuit 101 is decreased, an operating frequency on the side of the wireless charging receiver circuit 102 during coupling is decreased. When it is detected that the operating frequency on the side of the wireless charging receiver circuit 102 during coupling is decreased to some extent, in other words, when the transmission distance between the primary coil Lp and the secondary coil Ls is increased to a relatively large value, the alternating current frequency output on the side of the wireless charging transmitter circuit 101 cannot be further decreased. In this case, a capacitance value of the parallel resonant capacitor Cd is increased, to increase the output voltage of the wireless charging receiver circuit 102, so as to prevent a decrease in the output voltage of the wireless charging receiver circuit due to an increase in the transmission distance between the primary coil Lp of the wireless charging transmitter circuit 101 and the secondary coil Ls of the wireless charging receiver circuit 102.

Figure 4:
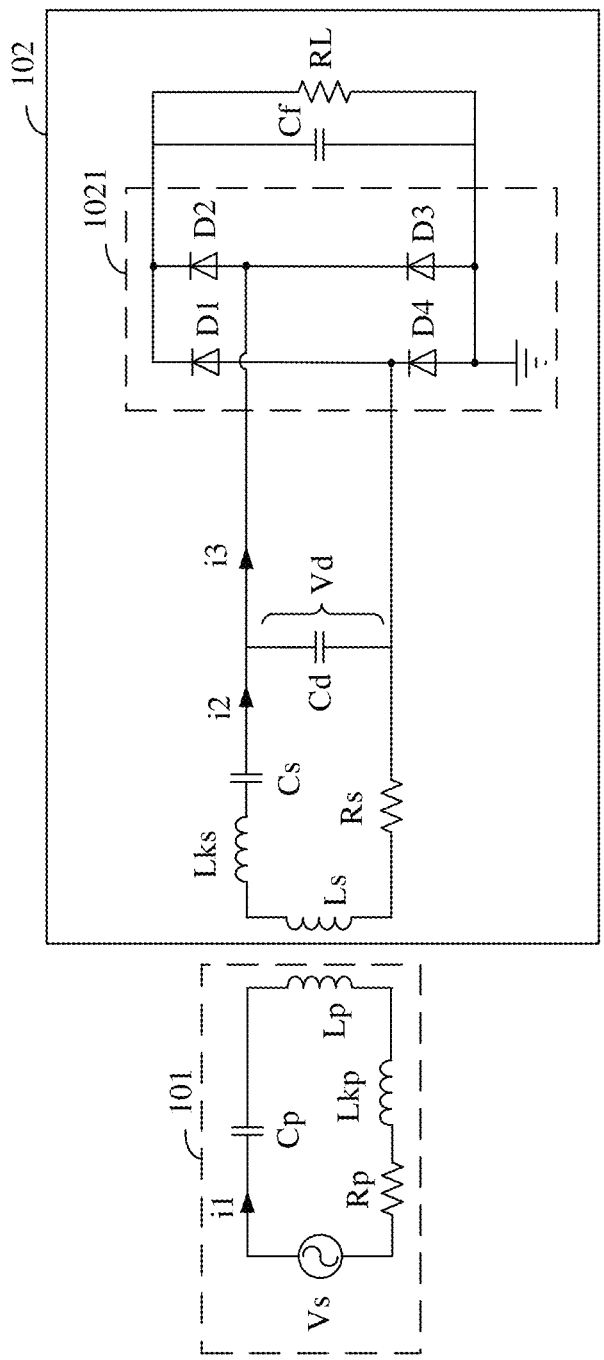
FIG. 4 is a schematic principle diagram of another wireless charging system according to an embodiment of this application.
Figure 5:
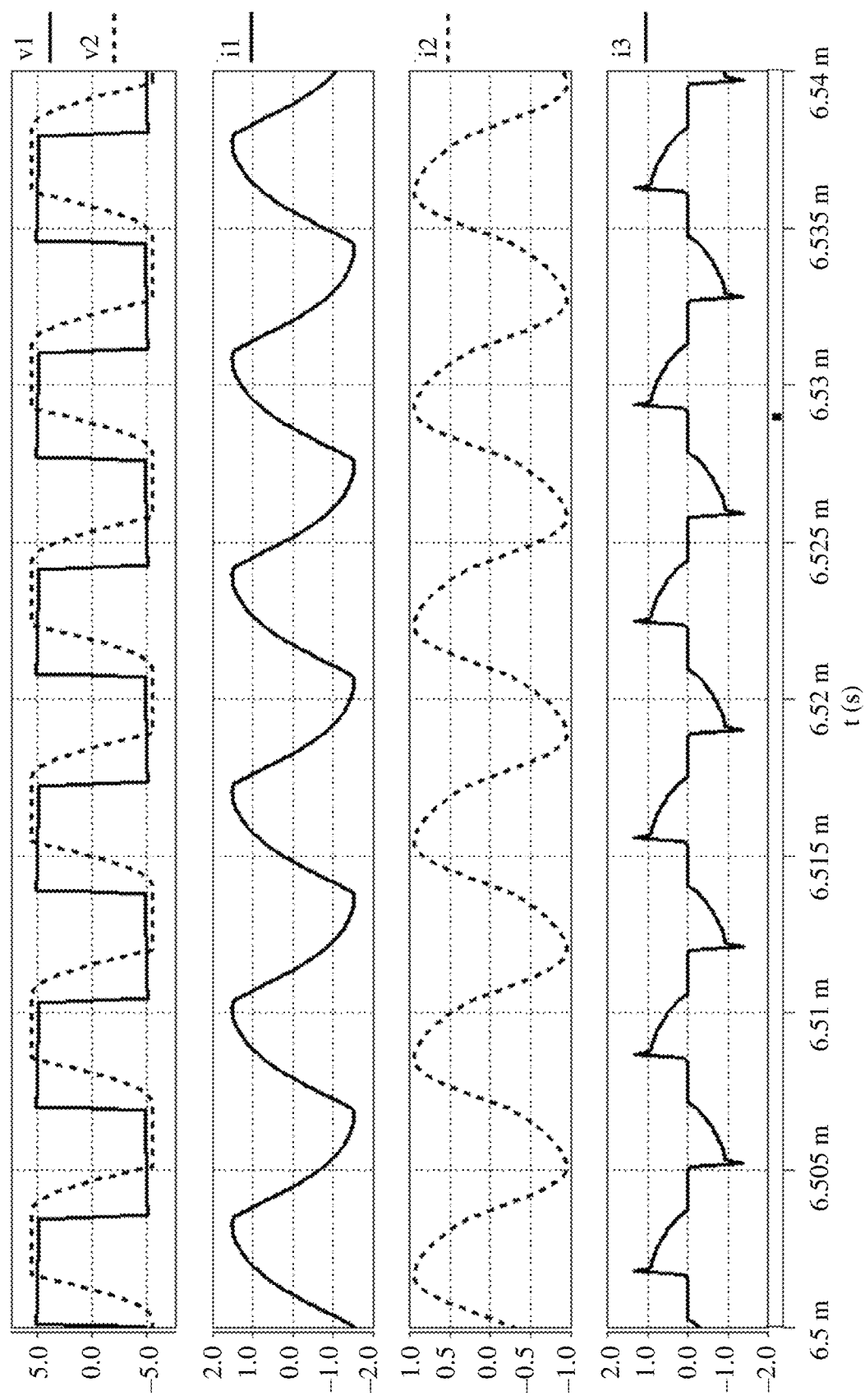
FIG. 5 is a schematic simulation diagram according to an embodiment of this application.

To better simulate real impact of the parallel resonant capacitor Cd on the circuit, on the basis of FIG. 3, a wireless charging system in FIG. 4 further includes a resistor Rp and a primary magnetic coupling system equivalent leakage inductance Lkp that are on the side of the wireless charging transmitter circuit 101, and a resistor Rs, a secondary magnetic coupling system equivalent leakage inductance Lks, and a filter capacitor Cf that are on the side of the wireless charging receiver circuit 102. For example, a rectifier circuit 1021 is a rectifier bridge including four diodes. In this case, a load of the wireless charging receiver circuit 102 is a non-linear load. Simulation is performed based on a principle diagram shown in FIG. 4, and a schematic simulation diagram is shown in FIG. 5. A simulation result includes a line current i1 and a voltage of an alternating-current power supply Vs that are on the side of the wireless charging transmitter circuit 101. FIG. 5 further shows a terminal voltage Vd of the parallel resonant capacitor Cd (that is, a voltage input to the rectifier circuit 1021) in the wireless charging receiver circuit 102, a line current i2 on the side of the wireless charging receiver circuit 102, and a current i3 input to the rectifier circuit 1021, where the terminal voltage Vd, the line current i2, and the current i3 are obtained after the parallel resonant capacitor Cd participates in resonation. A terminal voltage Vd of the parallel resonant capacitor Cd is an alternating-current voltage, and Vd lags behind a voltage V1 of the power supply by a specific phase difference. The line current i2 on the side of the wireless charging receiver circuit 102 is an approximate sine-wave current. The current i3 input to the rectifier circuit 1021 is a part of i2.

Factors that affect an output voltage of the wireless charging system include an operating frequency Fs of the wireless charging receiver circuit 102, the load RL, and the transmission distance between the primary coil Lp and the secondary coil Ls. A magnetic coupling system equivalent leakage inductance LK between the primary coil Lp and the secondary coil Ls is increased with the increase in the transmission distance between the primary coil Lp and the secondary coil Ls. Therefore, the transmission distance between the primary coil Lp and the secondary coil Ls may be replaced with the magnetic coupling system equivalent leakage inductance LK between the primary coil Lp and the secondary coil Ls.

Figure 6:
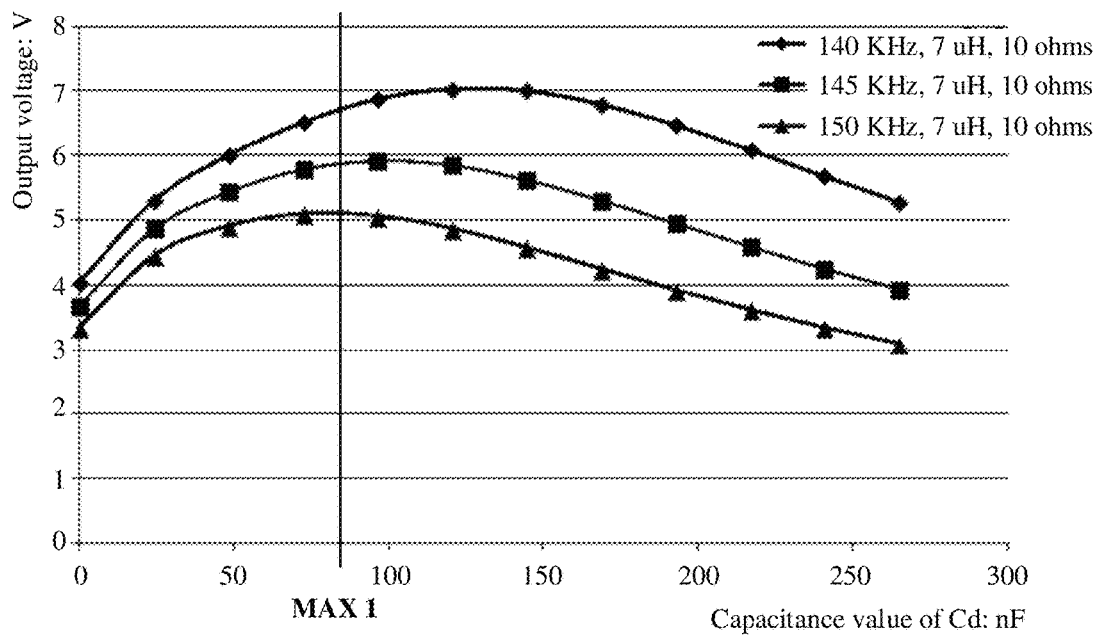
FIG. 6 is a schematic diagram in which an output voltage of a wireless charging receiver circuit varies with a parallel resonant capacitor according to an embodiment of this application.

FIG. 6 is a schematic diagram in which an output voltage of a wireless charging receiver circuit 102 varies with a parallel resonant capacitor Cd. In this case, a load RL is 10 ohms, a magnetic coupling system equivalent leakage inductance Lk is 7 uH, and operating frequencies Fs are 140 KHz, 145 KHz, and 150 KHz. It can be learned that a higher operating frequency Fs indicates a lower output voltage of the wireless charging receiver circuit 102. In addition, it can be further learned from FIG. 6 that the output voltage first increases and then decreases with an increase in a capacitance value of the parallel resonant capacitor Cd. In other words, each operating frequency Fs curve includes a single peak point and a monotonically increasing interval. A monotonically increasing interval [0, MAX 1] is obtained by obtaining an intersection of monotonically increasing intervals of all operating frequency Fs curves.

Figure 7:
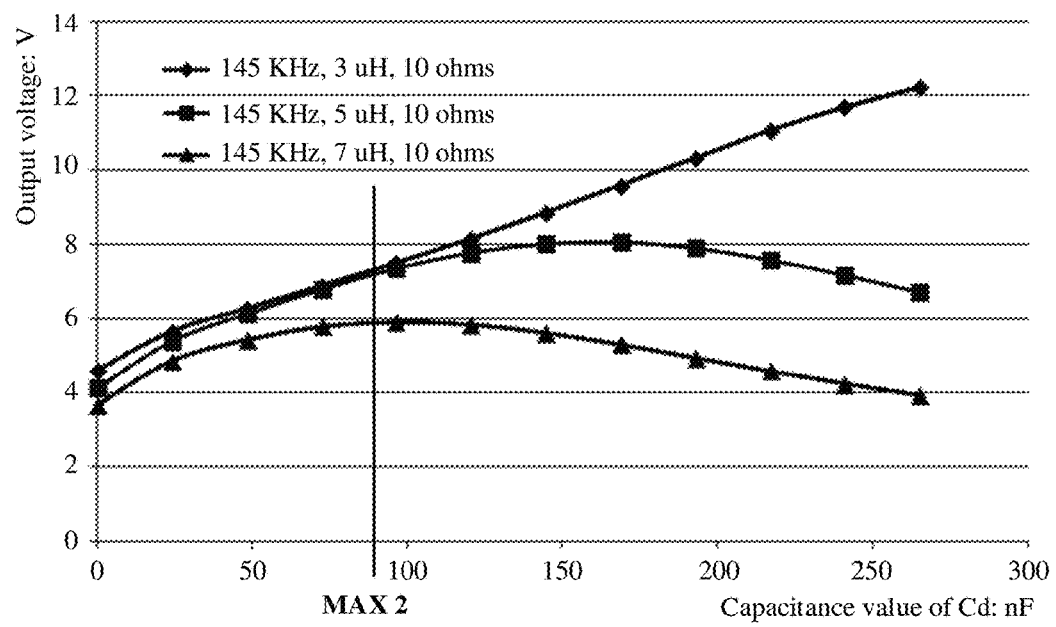
FIG. 7 is another schematic diagram in which an output voltage of a wireless charging receiver circuit varies with a parallel resonant capacitor according to an embodiment of this application.

FIG. 7 is another schematic diagram in which an output voltage of a wireless charging receiver circuit 102 varies with a parallel resonant capacitor Cd. In this case, a load RL is 10 ohms, an operating frequency Fs is 145 KHz, and magnetic coupling system equivalent leakage inductances Lk are 3 uH, 5 uH, and 7 uH. It can be learned from FIG. 7 that a higher magnetic coupling system equivalent leakage inductance LK (namely, a longer distance between the wireless charging transmitter circuit 101 and the wireless charging receiver circuit 102, or a longer distance between the primary coil Lp and the secondary coil Ls) indicates a lower output voltage of the wireless charging receiver circuit 102. As shown in FIG. 7, it is easily learned that the output voltage first increases and then decreases with an increase in a capacitance value of the parallel resonant capacitor Cd. In other words, each magnetic coupling system equivalent leakage inductance Lk curve includes a single peak point and a monotonically increasing interval. A monotonically increasing interval [0, MAX 2] is obtained by obtaining an intersection of monotonically increasing intervals of all magnetic coupling system equivalent leakage inductance Lk curves.

Figure 8:
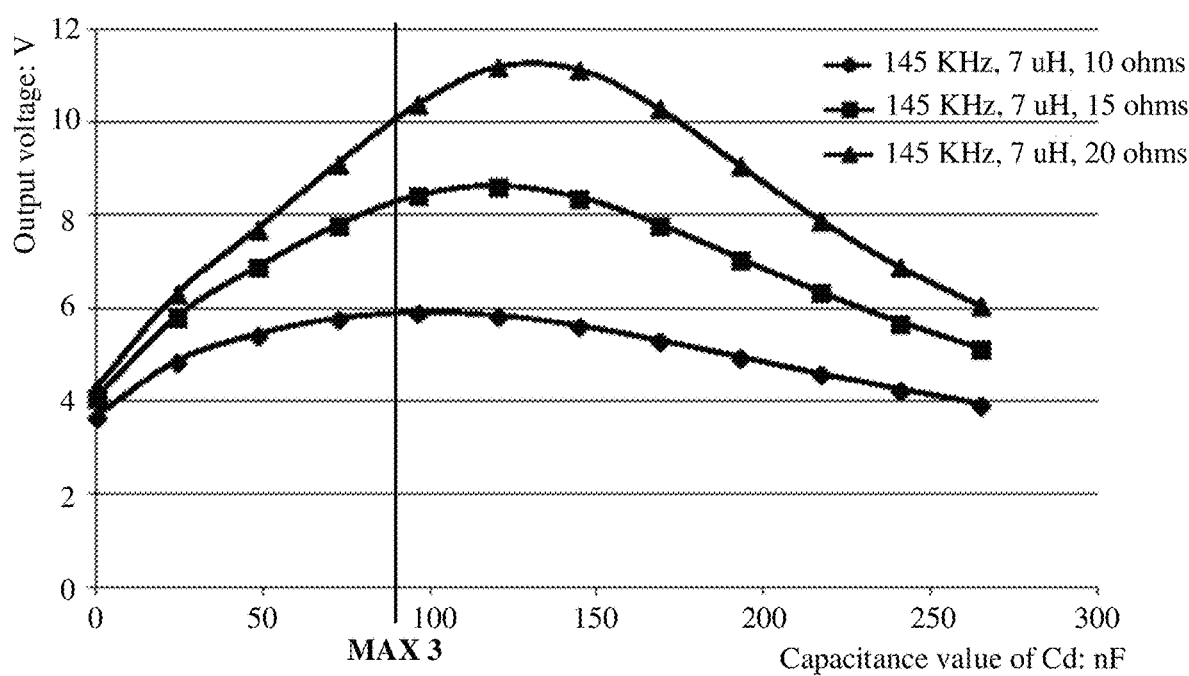
FIG. 8 is still another schematic diagram in which an output voltage of a wireless charging receiver circuit varies with a parallel resonant capacitor according to an embodiment of this application.

FIG. 8 is still another schematic diagram in which an output voltage of a wireless charging receiver circuit 102 varies with a parallel resonant capacitor Cd. In this case, an operating frequency Fs is 145 KHz, a magnetic coupling system equivalent leakage inductance Lk is 7 uH, and loads RL are 10 ohms, 15 ohms, and 20 ohms. It can be learned from FIG. 8 that a higher load RL indicates a higher output voltage of the wireless charging receiver circuit 102. As shown in FIG. 8, it can be easily learned that the output voltage first increases and then decreases with an increase in a capacitance value of the parallel resonant capacitor Cd. In other words, each load RL curve includes a single peak point and a monotonically increasing interval. A monotonically increasing interval [0, MAX 3] is obtained by obtaining an intersection of monotonically increasing intervals of all load RL curves.

It can be learned, with reference to FIG. 6 to FIG. 8, that an intersection [0, MAX] of the monotonically increasing intervals [0, MAX 1], [0, MAX 2], and [0, MAX 3] may be used as a monotonically increasing interval used to control the capacitance value of the parallel resonant capacitor Cd, and MAX may be used as a preset capacitance threshold. When the capacitance value of the parallel resonant capacitor Cd falls within the monotonically increasing interval [0, MAX], the output voltage always monotonically increases with the increase in the capacitance value of the parallel resonant capacitor Cd. The output voltage of the wireless charging receiver circuit 102 can increase with the increase in the capacitance value of the parallel resonant capacitor Cd, provided that the capacitance value of the parallel resonant capacitor Cd does not exceed the preset capacitance threshold MAX in an increasing process.

Figure 10:
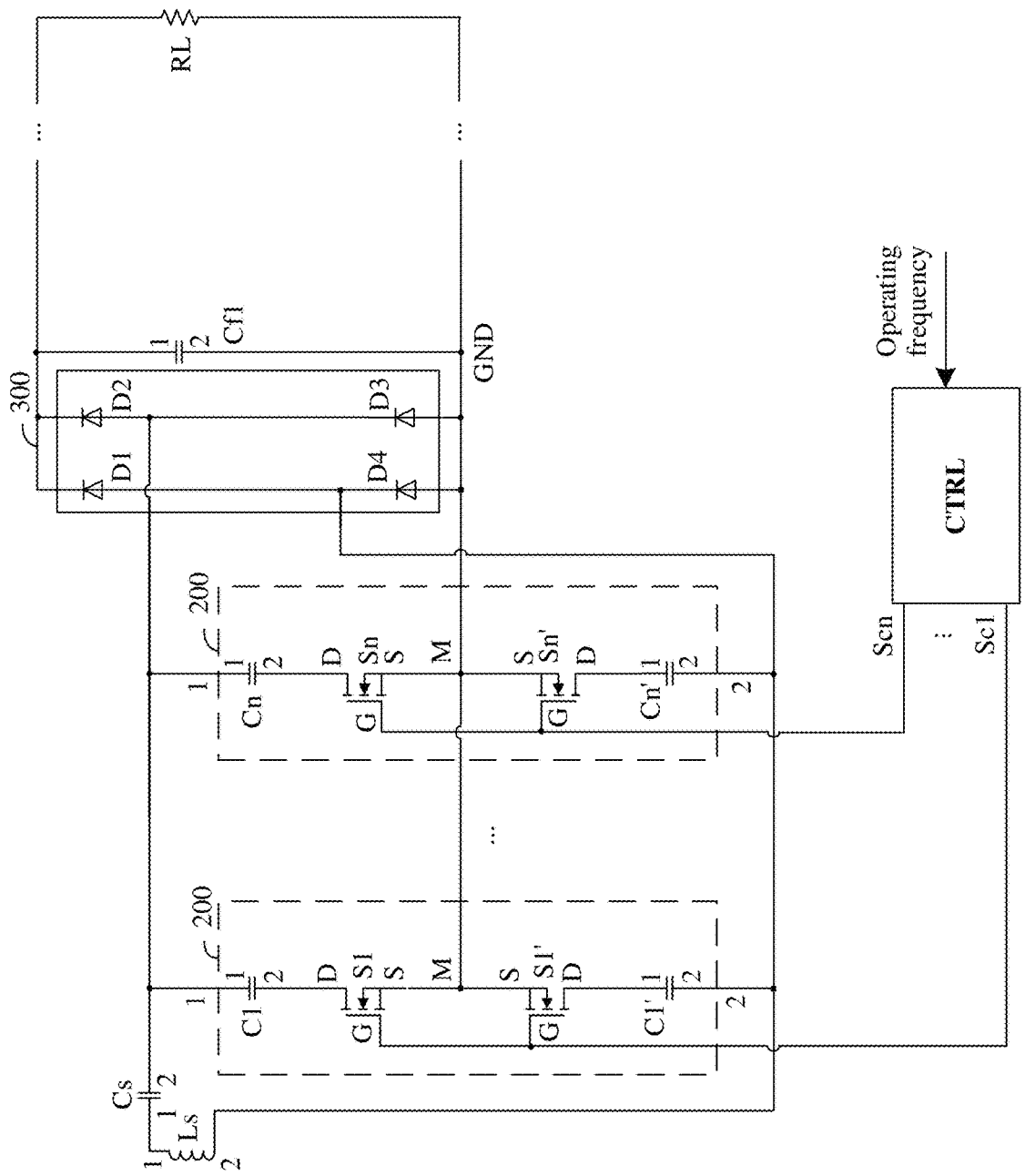
FIG. 10 is a schematic structural diagram of a wireless charging receiver circuit according to an embodiment of this application.

An adjustment range of a capacitance value of an existing adjustable capacitor device is relatively small. Therefore, the parallel resonant capacitor Cd may be equivalent to a plurality of sub-capacitors C1 to Cn connected in parallel. In this way, a capacitance value of each sub-capacitor may not be limited, and the capacitance value of the equivalent parallel resonant capacitor Cd may be adjusted in a large range. Then, each of the sub-capacitors C1 to Cn is connected in series to each of controllable switch devices S1 to Sn. A quantity of sub-capacitors C1 to Cn connected in parallel is controlled by controlling the controllable switch devices S1 to Sn to be closed or opened, to adjust the capacitance value of the equivalent parallel resonant capacitor Cd. However, as shown in FIG. 5, because the terminal voltage Vd of the parallel resonant capacitor Cd is the alternating-current voltage, a single controllable switch device can be opened or closed only in a half cycle, and a circuit balance effect is considered. Further, as shown in FIG. 10, each of the capacitors C1 to Cn is further equivalent to a capacitor pair in which capacitors are connected in series and have a same capacitance value, for example, (C1, C1'), (Cn, Cn'). In addition, whether each capacitor is connected to the wireless charging receiver circuit is still controlled by controlling one controllable switch device to be closed or opened. For example, whether the capacitor C1 is connected to the wireless charging receiver circuit is controlled by controlling the controllable switch device S1 to be closed or opened, and whether the capacitor C1' is connected to the wireless charging receiver circuit is controlled by controlling the controllable switch device S1' to be closed or opened. It should be noted that drive signals of the controllable switch devices S1 and S1' are connected together, and therefore whether the capacitors C1 and C1' are simultaneously connected to the wireless charging receiver circuit can be controlled. A similar control manner may be used for other capacitors (C2, C2'), (Cn, Cn').

"Whether a capacitor is connected to the wireless charging receiver circuit" means: If a controllable switch device corresponding to the capacitor is closed, the capacitor is connected to the wireless charging receiver circuit; or if a controllable switch device corresponding to the capacitor is opened, the capacitor is not connected to the wireless charging receiver circuit. When a capacitor is connected to the wireless charging receiver circuit, the capacitor is a part of an operating capacitor of the wireless charging receiver circuit, and therefore the capacitor can affect the output voltage and the operating frequency of the wireless charging receiver circuit. When a capacitor is not connected to the wireless charging receiver circuit, the capacitor is not a part of an operating capacitor of the wireless charging receiver circuit, and therefore the capacitor does not affect the output voltage and the operating frequency of the wireless charging receiver circuit. In this case, the capacitor does not operate, or does not actually participate in operating of the wireless charging receiver circuit.

For ease of description, in the embodiments of this application, a first end, a first input end, or a first output end is represented by a number "1" in a device or a circuit to which the first end, the first input end, or the first output end belongs in the accompanying drawings, and a second end, a second input end, or a second output end is represented by a number "2" in a device or a circuit to which the second end, the second input end, or the second output end belongs in the accompanying drawings.

The wireless charging receiver circuit in the embodiments of this application may be applied to a terminal device. The terminal device includes a handheld device, vehicle-mounted device, wearable device, or computing device that has a wireless communication function, or another processing device connected to a wireless modem. The terminal device may alternatively include a subscriber unit, a cellular phone, a smart phone, a wireless data card, a personal digital assistant (PDA) computer, a tablet computer, a wireless modem, a handheld device, a laptop computer, a cordless phone, a wireless local loop (WLL) station, a machine type communication (MTC) terminal, user equipment (UE), a mobile station (MS), a terminal device, relay equipment, or the like. The relay equipment may be, for example, a 5G residential gateway (RG), or a radio relay.

Figure 9:
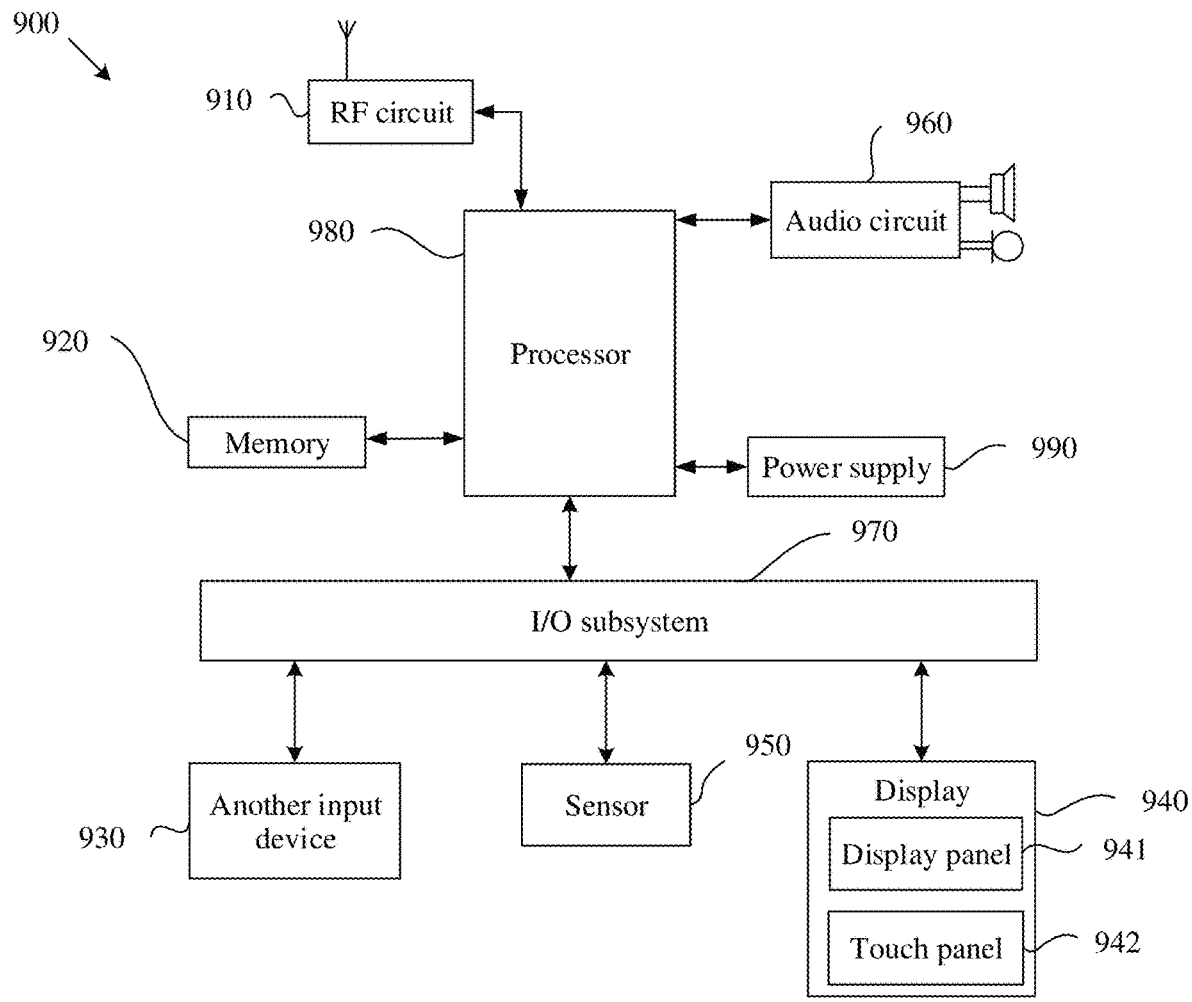
FIG. 9 is a schematic structural diagram of a terminal device according to an embodiment of this application.

FIG. 9 is a schematic structural diagram of a terminal device according to an embodiment of this application. In FIG. 9, that the terminal device is a mobile phone is used as an example to describe a universal hardware architecture of the mobile phone.

A mobile phone 900 may include components such as a radio frequency (RF) circuit 910, a memory 920, another input device 930, a display 940, a sensor 950, an audio circuit 960, an I/O subsystem 970, a processor 980, and a power supply 990. A person skilled in the art may understand that a structure of the mobile phone shown in the figure does not constitute any limitation on the mobile phone, and may include more or fewer components than those shown in the figure, or some components may be combined, or some components may be split, or different component arrangements may be used. A person skilled in the art may understand that the display 940 is a user interface (UI), and the display 940 may include a display panel 941 and a touch panel 942. Although not shown, the mobile phone may further include functional modules or components such as a camera and a Bluetooth module. Details are not described herein.

Further, the processor 980 is connected to the RF circuit 910, the memory 920, the audio circuit 960, the I/O subsystem 970, and the power supply 990. The I/O subsystem 970 is connected to the another input device 930, the display 940, and the sensor 950. The RF circuit 910 may be configured to receive and send a signal in an information receiving and sending process or a call process. In particular, the RF circuit 910 receives downlink information from a network side, and then sends the downlink information to the processor 980 for processing. The memory 920 may be configured to store a software program and a software module. The processor 980 runs the software program and the software module that are stored in the memory 920, to perform various function applications and data processing of the mobile phone, for example, perform a method and a function performed by a terminal device in the embodiments of this application. The another input device 930 may be configured to receive entered digital or character information, and generate a keyboard signal input related to user settings and function control of the mobile phone. The display 940 may be configured to display information entered by a user or information provided for a user and various menus of the mobile phone, and may further receive a user input. The sensor 950 may be an optical sensor, a movement sensor, or another sensor. The audio circuit 960 may provide an audio interface between a user and the mobile phone. The I/O subsystem 970 is configured to control an external input/output device, and the external device may include an input controller, a sensor controller, and a display controller of another device. The processor 980 is a control center of the mobile phone 900. The processor 980 is connected to each part of the entire mobile phone through various interfaces and cables. In addition, the processor 980 performs various functions of the mobile phone 900 and processes data by running or executing the software program and/or module that are/is stored in the memory 920 and invoking data stored in the memory 920, to perform overall monitoring on the mobile phone.

The power supply 990 may include a battery and the wireless charging receiver circuit in the embodiments of this application. The power supply 990 is configured to supply power to the foregoing components. Preferably, the power supply may be logically connected to the processor 980 via a power management system, to implement functions such as charging management, discharging management, and power consumption management via the power management system.

For the wireless charging receiver circuit in the embodiments of this application, loads RL include the battery and the components in the terminal device other than the power supply 990. The wireless charging receiver circuit may obtain energy from a wireless charging transmitter circuit, and supply power to the loads RL.

FIG. 10 is a schematic structural diagram of a wireless charging receiver circuit according to an embodiment of this application. The wireless charging receiver circuit includes N capacitor-switch networks 200, a rectifier circuit 300, and a controller CTRL, where N is an integer greater than or equal to 1. It should be noted that, for clarity of description, the accompanying drawings in the embodiments of this application show a plurality of capacitor-switch networks 200 as examples, but are not intended to limit use of the plurality of capacitor-switch networks 200.

A first end of each capacitor-switch network 200 is connected to a first input end of the rectifier circuit 300. A second end of each capacitor-switch network 200 is connected to a second input end of the rectifier circuit 300. To be specific, when there are at least two one capacitor-switch networks 200, the capacitor-switch networks 200 are connected in parallel. In other words, first ends of all the capacitor-switch networks 200 are connected to the first input end of the rectifier circuit 300, and second ends of all the capacitor-switch networks 200 are connected to the second input end of the rectifier circuit 300.

For example, the rectifier circuit 300 is implemented as a rectifier bridge including four diodes (D1 to D4) shown in FIG. 10, or may be implemented in another manner, for example, implemented as an integrated rectifier chip. This is not limited in this application.

In an embodiment, the wireless charging receiver circuit further includes a first filter capacitor Cf1. A first output end of the rectifier circuit 300 is connected to a first end of the first filter capacitor Cf1, and a second output end of the rectifier circuit 300 is connected to a second end of the first filter capacitor Cf1. A direct current output by the rectifier circuit 300 includes clutter. After the clutter is filtered out by the first filter capacitor Cf1, the direct current may be supplied to a load RL.

The following describes an operating principle of a capacitor-switch network 200 by using an $n^{th}$ ($1 \le n \le N$) capacitor-switch network 200 as an example.

The capacitor-switch network 200 includes a first capacitor Cn, a second capacitor Cn', a first controllable switch device Sn, a second controllable switch device Sn', and a ground point M. The ground point M may be connected to a ground end GND of the rectifier circuit 300. The first capacitor Cn located on one side of the ground point M is connected in series to the first controllable switch device Sn, and the second capacitor Cn' located on the other side of the ground point M is connected in series to the second controllable switch device Sn. In the same capacitor-switch network 200, a capacitance value of the first capacitor Cn is equal to a capacitance value of the second capacitor Cn'. The limitations on the first capacitor Cn and the second capacitor Cn' ensure that an electrical potential at the ground point M in the capacitor-switch network 200 is 0; otherwise, an unbalanced current is generated at the ground point M.

In the same capacitor-switch network 200, the capacitance value of the first capacitor Cn is equal to the capacitance value of the second capacitor Cn'. Capacitance values of first capacitors Cn in different capacitor-switch networks 200 may be different. In an embodiment, a capacitance value of a first capacitor in an $(i+1)^{th}$ capacitor-switch network is K times a capacitance value of a first capacitor in an $i^{th}$ capacitor-switch network, and a capacitance value of a second capacitor in the $(i+1)^{th}$ capacitor-switch network is K times a capacitance value of a second capacitor in the $i^{th}$ capacitor-switch network, where i is an integer, $1 \le i \le N-1$, and $1 \le K \le 10$. For example, the capacitance values of the first capacitor and the second capacitor in the $i^{th}$ capacitor-switch network 200 each are a*Ki, and the capacitance values of the first capacitor and the second capacitor in the $(i+1)^{th}$ capacitor-switch network 200 each are a*Ki+1, where a is a coefficient of proportionality. For example, K may be 2.

For example, the first capacitor Cn, the second capacitor Cn', the first controllable switch device Sn, and the second controllable switch device Sn' are connected in series in a manner shown in FIG. 10. The first capacitor Cn, the first controllable switch device Sn, the second controllable switch device Sn', the second capacitor Cn' are sequentially connected in series, and the ground point M in the capacitor-switch network 200 is located between the first controllable switch device Sn and the second controllable switch device Sn'. A first end of the first capacitor Cn is connected to the first input end of the rectifier circuit 300, a second end of the first capacitor Cn is connected to a first end of the first controllable switch device Sn, a second end of the first controllable switch device Sn is connected to a first end of the second controllable switch device Sn', a second end of the second controllable switch device is connected to a first end of the second capacitor Cn', a second end of the second capacitor Cn' is connected to the second input end of the rectifier circuit 300, and a common connection point between the second end of the first controllable switch device Sn and the first end of the second controllable switch device Sn' is grounded.

Figure 11:
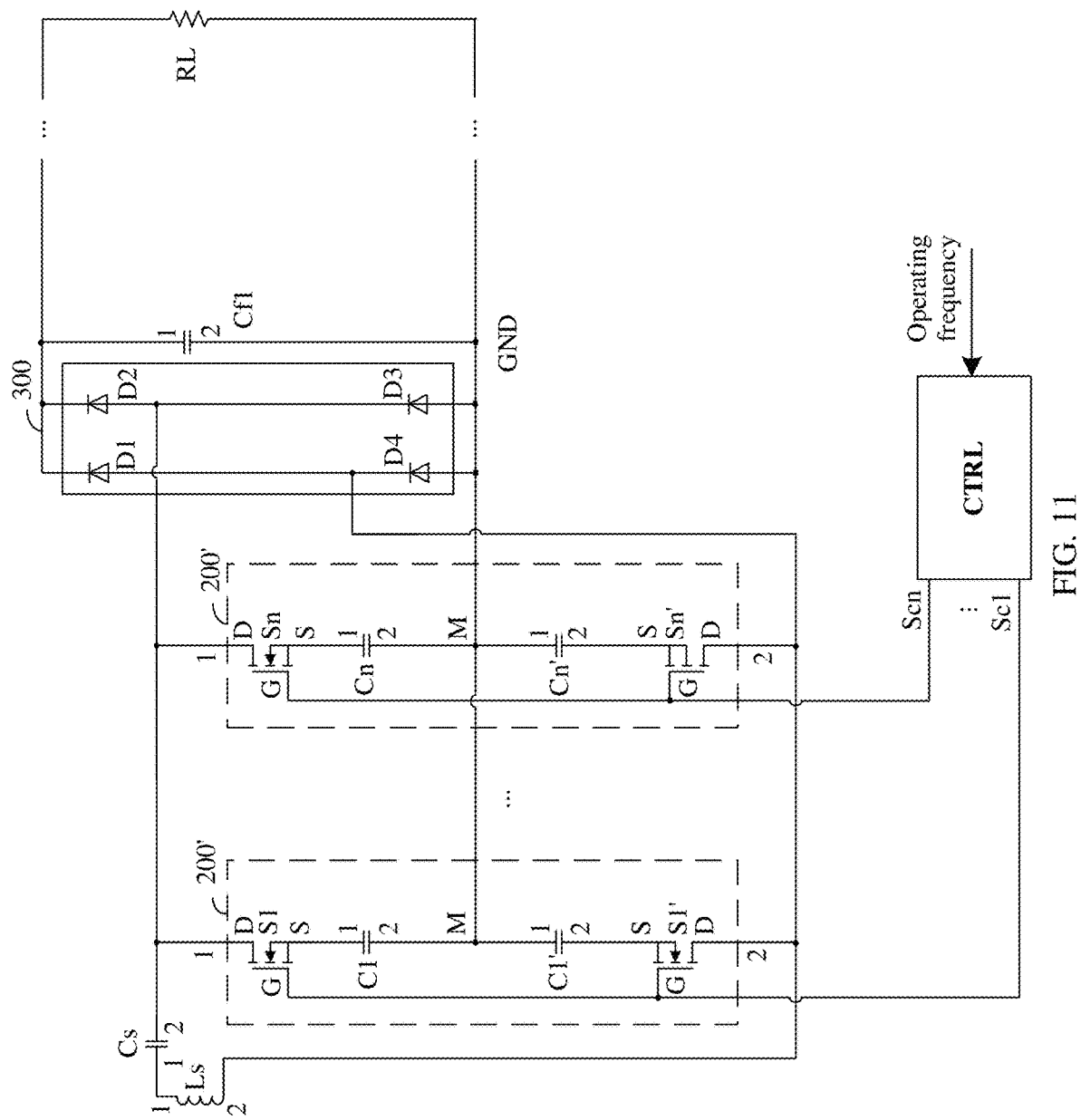
FIG. 11 is a schematic structural diagram of another wireless charging receiver circuit according to an embodiment of this application.

For example, the first capacitor Cn, the second capacitor Cn', the first controllable switch device Sn, and the second controllable switch device Sn' are connected in series in another manner shown in FIG. 11. The first controllable switch device Sn, the first capacitor Cn, and the second capacitor Cn', and the second controllable switch device Sn' are sequentially connected in series, and the ground point M in a capacitor-switch network 200' is located between the first capacitor Cn and the second capacitor Cn'. A first end of the first controllable switch device Sn is connected to the first input end of the rectifier circuit 300, a second end of the first controllable switch device Sn is connected to a first end of the first capacitor Cn, a second end of the first capacitor Cn is connected to a first end of the second capacitor Cn', a second end of the second capacitor Cn' is connected to a first end of the second controllable switch device Sn', a second end of the second controllable switch device Sn' is connected to the second input end of the rectifier circuit 300, and a common connection point between the second end of the first capacitor Cn and the first end of the second capacitor Cn' is grounded.

A controllable switch device (regardless of the first controllable switch device Sn or the second controllable switch device Sn') includes a control end. When the control end of the controllable switch device is at a first level, the controllable switch device is closed. When the control end of the controllable switch device is at a second level, the controllable switch device is opened. The controllable switch device may be controlled to be closed or opened by controlling to input different level signals to the control end.

For example, the first controllable switch device Sn and the second controllable switch device Sn' each are implemented as an N-type metal-oxide-semiconductor field-effect transistor (metal-oxide-semiconductor field-effect transistor, MOSFET) shown in FIG. 10 or FIG. 11. A G end of the MOSFET is the control end. When the first level signal is input to the G end of the MOSFET, an S end and a D end of the MOSFET are closed. When the second level signal is input to the G end of the MOSFET, an S end and a D end of the MOSFET are opened. A first level is a high level, and a second level is a low level. It should be noted that the controllable switch device may alternatively be implemented in another manner, for example, implemented as a P-type MOSFET. After being correspondingly adjusted, the circuit can be applied to the embodiments of this application. Therefore, a specific embodiment of the controllable switch device is not limited in this application.

The controller CTRL includes N output ends. The N output ends one-to-one correspond to the N capacitor-switch networks, and each output end is configured to be connected to a control end of a first controllable switch device Sn in a corresponding capacitor-switch network and a control end of a second controllable switch device Sn' in the corresponding capacitor-switch network. For example, an $n^{th}$ output end of the controller CTRL is connected to a control end of a first controllable switch device Sn in an $n^{th}$ capacitor-switch network and a control end of a second controllable switch device Sn' in the $n^{th}$ capacitor-switch network, where $1 \le n \le N$. When the $n^{th}$ output end outputs a first level, the first controllable switch device Sn and the second controllable switch device Sn' in the $n^{th}$ capacitor-switch network are closed, so that the first capacitor Cn and the second capacitor Cn' in the $n^{th}$ capacitor-switch network are connected to the wireless charging receiver circuit, and a total value of capacitance values of capacitors connected in parallel is increased. When the $n^{th}$ output end outputs a second level, the first controllable switch device Sn and the second controllable switch device Sn' in the $n^{th}$ capacitor-switch network are opened, so that the first capacitor Cn and the second capacitor Cn' in the $n^{th}$ capacitor-switch network are disconnected from the circuit, and a total value of capacitance values of capacitors connected in parallel is decreased.

The controller CTRL may share the ground point with the capacitor-switch networks 200. Therefore, there is no need to add a power supply for driving or assisting in power supplying for isolation, and a circuit design can be simplified.

The controller CTRL is configured to obtain an operating frequency of an alternating-current voltage between the first input end and the second input end of the rectifier circuit 300. For example, the controller CTRL may obtain the operating frequency via an application-specific integrated circuit (IC).

When the operating frequency is less than a first frequency threshold, and a total value of capacitance values of a first capacitor Cn and a second capacitor Cn' that are in the N capacitor-switch networks 200 and that are connected to the wireless charging receiver circuit are less than a preset capacitance threshold MAX, the controller CTRL adjusts an output level at each output end, to control a first controllable switch device Sn and a second controllable switch device Sn' in each capacitor-switch network 200 to be closed or opened, to increase the total value of the capacitance values of the capacitors that are in the N capacitor-switch networks 200 and that are connected to the wireless charging receiver circuit.

When the operating frequency is greater than a second frequency threshold, the controller CTRL adjusts an output level at each output end, to control a first controllable switch device and a second controllable switch device in each capacitor-switch network 200 to be closed or opened, to decrease a total value of capacitance values of capacitors that are in the N capacitor-switch networks and that are connected to the wireless charging receiver circuit. The first frequency threshold is less than or equal to the second frequency threshold.

The controller CTRL may include a proportional integral calculator. A difference between the operating frequency and a preset frequency threshold is input into the proportional integral calculator, to obtain a comparison result between the operating frequency and the preset frequency threshold.

As described above, when a transmission distance is increased, an alternating current frequency output on a side of a wireless charging transmitter circuit 101 may be decreased, to compensate for decreases in an output voltage and an output power on the side of the wireless charging receiver circuit 102 due to an increase in the transmission distance. In this case, a resonant operating frequency on the side of the wireless charging receiver circuit 102 is also decreased. An adjustment range of the alternating current frequency on the side of the wireless charging transmitter circuit 101 is limited, and an adjustment range of the resonant operating frequency on the side of the wireless charging receiver circuit 102 is also limited. Therefore, when the operating frequency is decreased to a value below the first frequency threshold, a capacitance value of a parallel resonant capacitor Cd is controlled to be increased, to compensate for the decreases in the output voltage and the output power of the wireless charging receiver circuit; or when the operating frequency is increased to a value above the second frequency threshold, a capacitance value of a parallel resonant capacitor Cd is controlled to be decreased, to prevent the output voltage and the output power of the wireless charging receiver circuit from being excessively high.

In an embodiment, the controller may control, in an order of capacitance values of a first capacitor and a second capacitor in each capacitor-switch network 200, an output end to output a first level or a second level. For example, as described above, it is assumed that capacitance values of a first capacitor and a second capacitor in an $i^{th}$ capacitor-switch network 200 each are $a*Ki$, and capacitance values of a first capacitor and a second capacitor in an $(i+1)^{th}$ capacitor-switch network 200 each are $a*Ki+1$. Before a total value of capacitance values of a first capacitor and a second capacitor that are in a capacitor-switch network and that are connected to the wireless charging receiver circuit are increased, a $1^{st}$ output end to an $i^{th}$ output end of the controller all output a first level, and an $(i+1)^{th}$ output end to an $N^{th}$ output end of the controller all output a second level. When the foregoing condition under which the capacitance values are increased is satisfied, the $1^{st}$ output end to the $(i+1)^{th}$ output end of the controller output a first level, and an $(i+2)^{th}$ output end to the $N^{th}$ output end of the controller output a second level.

In an embodiment, the controller may control, in a minimum capacitance step mode, an output end to output a first level or a second level. For example, as described above, it is assumed that capacitance values of a first capacitor and a second capacitor in an $i^{th}$ capacitor-switch network 200 each are $a*Ki$, and capacitance values of a first capacitor and a second capacitor in an $(i+1)^{th}$ capacitor-switch network 200 each are $a*Ki+1$. Before a total value of capacitance values of a first capacitor and a second capacitor that are in a capacitor-switch network and that are connected to the wireless charging receiver circuit are increased, an $i^{th}$ output end of the controller outputs a first level, and all other output ends of the controller output a second level. When the foregoing condition under which the capacitance values are increased is satisfied, a $1^{st}$ output end and the $i^{th}$ output end of the controller output a first level, and all other output ends of the controller output a second level.

It should be noted that the foregoing control manners used to change the capacitance value of the parallel resonant capacitor Cd each time are not limited.

In an embodiment, the wireless charging receiver circuit further includes a secondary coil Ls and a secondary series resonant capacitor Cs. A first end of the secondary coil Ls is connected to a first end of the secondary series resonant capacitor Cs, and a second end of the secondary series resonant capacitor Cs is connected to first ends of the N capacitor-switch networks 200 and the first input end of the rectifier circuit 300. A second end of the secondary coil Ls is connected to second ends of the N capacitor-switch networks 200 and the second input end of the rectifier circuit 300.

The secondary coil Ls is configured to be coupled to a primary coil of the wireless charging transmitter circuit. The secondary series resonant capacitor Cs and the secondary coil Ls generate a series resonance. The N capacitor-switch networks 200, the secondary series resonant capacitor Cs, and the secondary coil Ls generate a parallel resonance.

In the wireless charging receiver circuit provided in this embodiment of this application, the N capacitor-switch networks are connected in parallel, and the controller controls the first controllable switch device and the second controllable switch device in each capacitor-switch network to be closed or opened, to control the capacitance values of the capacitors that are in the N capacitor-switch networks and that are connected to the wireless charging receiver circuit. Further, when the operating frequency of the alternating-current voltage input between the first input end and the second input end of the rectifier circuit is less than the first frequency threshold, the capacitance values of the capacitors that are in the N capacitor-switch networks and that are connected to the wireless charging receiver circuit are controlled to be increased. When the operating frequency is greater than the second frequency threshold, the capacitance values of the capacitors that are in the N capacitor-switch networks and that are connected to the wireless charging receiver circuit are controlled to be decreased. In other words, the first controllable switch device and the second controllable switch device in each of the N capacitor-switch networks are controlled to be closed or opened. In this way, the total value of the capacitance values of the capacitors connected to the wireless charging receiver circuit can be increased or decreased, and an operating frequency of an alternating current input to the rectifier circuit on the side of the wireless charging receiver circuit can be adjusted. Therefore, this application provides a simple circuit structure for controlling the operating frequency of the alternating current input to the rectifier circuit.

Figure 12:
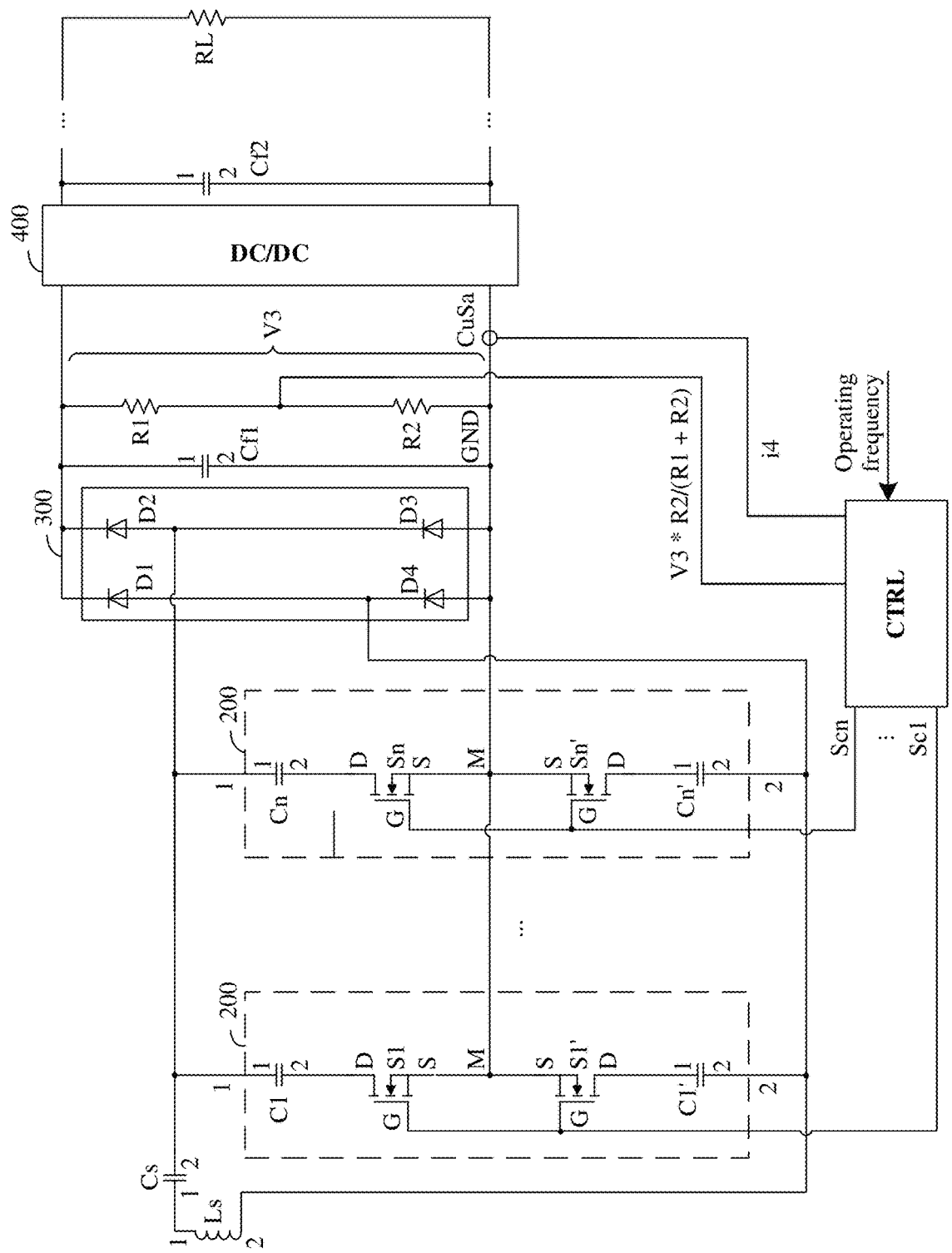
FIG. 12 is a schematic structural diagram of still another wireless charging receiver circuit according to an embodiment of this application.

In an embodiment, as shown in FIG. 12, the wireless charging receiver circuit may further include a direct-current/direct-current (DC/DC) voltage step-down circuit 400.

A first input end of the DC/DC voltage step-down circuit 400 is connected to the first end of the first filter capacitor Cf1, a second input end of the DC/DC voltage step-down circuit 400 is connected to the second end of the first filter capacitor Cf1, a first output end of the DC/DC voltage step-down circuit 400 is connected to a first end of the load RL, and a second output end of the DC/DC voltage step-down circuit 400 is connected to a second end of the load RL. The DC/DC voltage step-down circuit 400 is configured to decrease a voltage between the two ends of the first filter capacitor Cf1, to increase equivalent load impedance.

When the output power of the wireless charging receiver circuit is adjusted, the output voltage is required to remain stable. As described above, when the capacitance value of the parallel resonant capacitor is increased, a voltage output by the rectifier circuit 300 is increased. In this case, the DC/DC voltage step-down circuit 400 needs to be correspondingly adjusted, so that a voltage output by the DC/DC voltage step-down circuit 400 (namely, the wireless charging receiver circuit) is stable.

In an embodiment, as shown in FIG. 12, the wireless charging receiver circuit may further include a first resistor R1 and a second resistor R2.

A first end of the first resistor R1 is connected between the first end of the first filter capacitor Cf1 and the first input end of the DC/DC voltage step-down circuit 400, and connected to the first output end of the rectifier circuit 300; and a second end of the first resistor R1 is connected to a first end of the second resistor R2, and a second end of the second resistor R2 is connected to the second output end of the rectifier circuit 300. The first end of the second resistor R2 is connected to a first input end of the controller CTRL. The first resistor R1 and the second resistor R2 are configured to measure the voltage V3 output by the rectifier circuit 300.

A voltage Vx at a lead-out point between the second end of the first resistor R1 and the first end of the second resistor R1 is Vx=V3*R2/(R1+R2). The voltage V3 output by the rectifier circuit 300 may be reversely derived according to V3=Vx*(R1+R2)/R2. It should be noted that the voltage V3 is measured through voltage division because the voltage V3 output by the rectifier circuit 300 is usually relatively high and exceeds a withstand voltage at an input end of the controller CTRL. The voltage at the lead-out point is decreased to a value below the withstand voltage at the input end of the controller CTRL through voltage distribution to the first resistor and the second resistor.

In an embodiment, if the DC/DC voltage step-down circuit 400 does not include a filter capacitor, the wireless charging receiver circuit may further include a second filter capacitor Cf2. A first end of the second filter capacitor Cf2 is connected between the first output end of the DC/DC voltage step-down circuit 400 and the first end of the load RL, and a second end of the second filter capacitor Cf2 is connected between the second output end of the DC/DC voltage step-down circuit 400 and the second end of the load RL. The second filter capacitor Cf2 is configured to filter a current output by the DC/DC voltage step-down circuit 400.

In an embodiment, the wireless charging receiver circuit may further include a current sampling apparatus CuSa. The current sampling apparatus CuSa is located on a positive end or a ground end between the first filter capacitor Cf1 and the DC/DC voltage step-down circuit 400. The current sampling apparatus CuSa is connected to a second input end of the controller CTRL, and configured to measure a current i4 output by the rectifier circuit 300. The current sampling apparatus CuSa may measure a current based on a ratio of a voltage drop between two ends of a resistor to a resistance value of the resistor.

It should be noted that there may be another manner of measuring the voltage V3 and the current i4 that are output by the rectifier circuit. This is not limited in this application.

The controller CTRL may be further configured to:

obtain the voltage V3 and the current i4 that are output by the rectifier circuit; obtain an output power P=V3*i4 based on the voltage V3 and the current i4; and when the operating frequency is greater than or equal to the first frequency threshold and less than or equal to the second frequency threshold, the total value of the capacitance values of the capacitors that are in the N capacitor-switch networks and that are connected to the wireless charging receiver circuit are less than the preset capacitance threshold, and the output power is less than a preset power threshold, adjust an output level at each output end, to control a first controllable switch device and a second controllable switch device in each capacitor-switch network to be closed or opened, to increase the total value of the capacitance values of the capacitors that are in the N capacitor-switch networks and that are connected to the wireless charging receiver circuit.

For a specific manner of increasing the total value of the capacitance values of the capacitors that are in the N capacitor-switch networks and that are connected to the wireless charging receiver circuit, refer to the foregoing descriptions. Details are not described herein again.

In an embodiment, the first controllable switch device and the second controllable switch device in each of the N capacitor-switch networks may be controlled, based on the output power of the rectifier circuit and the operating frequency, to be closed or opened. In this way, the total value of the capacitance values of the capacitors connected to the wireless charging receiver circuit can be increased or decreased, and an operating frequency of an alternating current input to the rectifier circuit on the side of the wireless charging receiver circuit can be adjusted.

Figure 13:
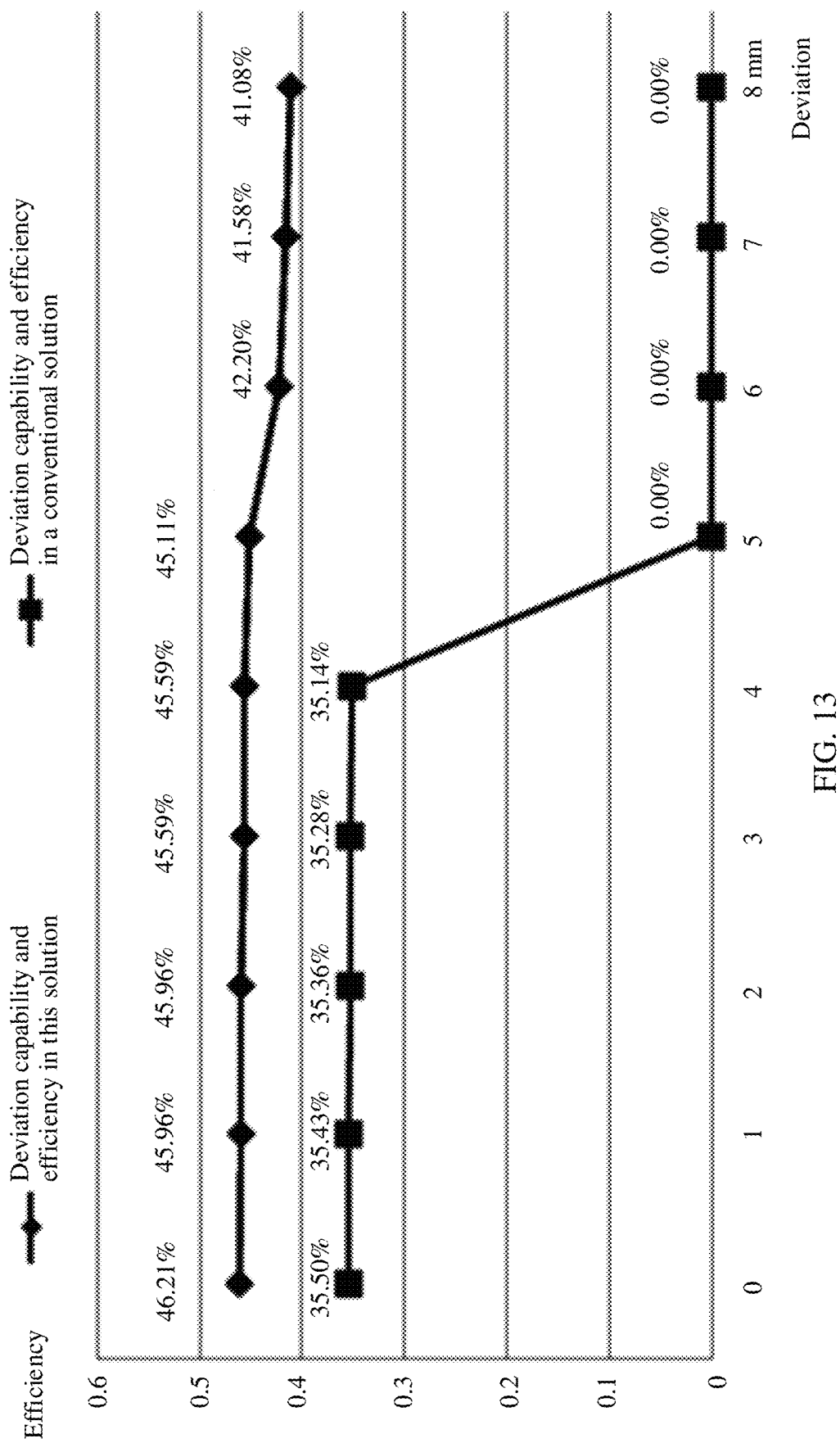
FIG. 13 is a schematic diagram of comparison between a deviation capability and efficiency of a wireless charging receiver circuit in an embodiment of this application and a deviation capability and efficiency of a conventional wireless charging receiver circuit.

FIG. 13 is a schematic diagram of comparison between a deviation capability and efficiency of a wireless charging receiver circuit in an embodiment of this application and a deviation capability and efficiency of a conventional wireless charging receiver circuit. A deviation refers to a change of a transmission distance between a primary coil and a secondary coil on a plane that is parallel with or perpendicular to a plane on which the primary coil or the secondary coil is located. For example, in FIG. 13, that a transmission distance remains 5 mm on a vertical plane and a transmission distance is gradually increased from 0 mm on a parallel plane is used as an example for description. It can be learned that with respect to each deviation distance, transmission efficiency of this solution is higher than transmission efficiency of a conventional solution, and is increased by about 10%. In addition, particular transmission efficiency can still be ensured when a deviation reaches 8 mm relative to the plane that is parallel with the plane on which the primary coil or the secondary coil is located. However, in the conventional solution, transmission cannot be performed when the deviation is 5 mm.

Figure 14:
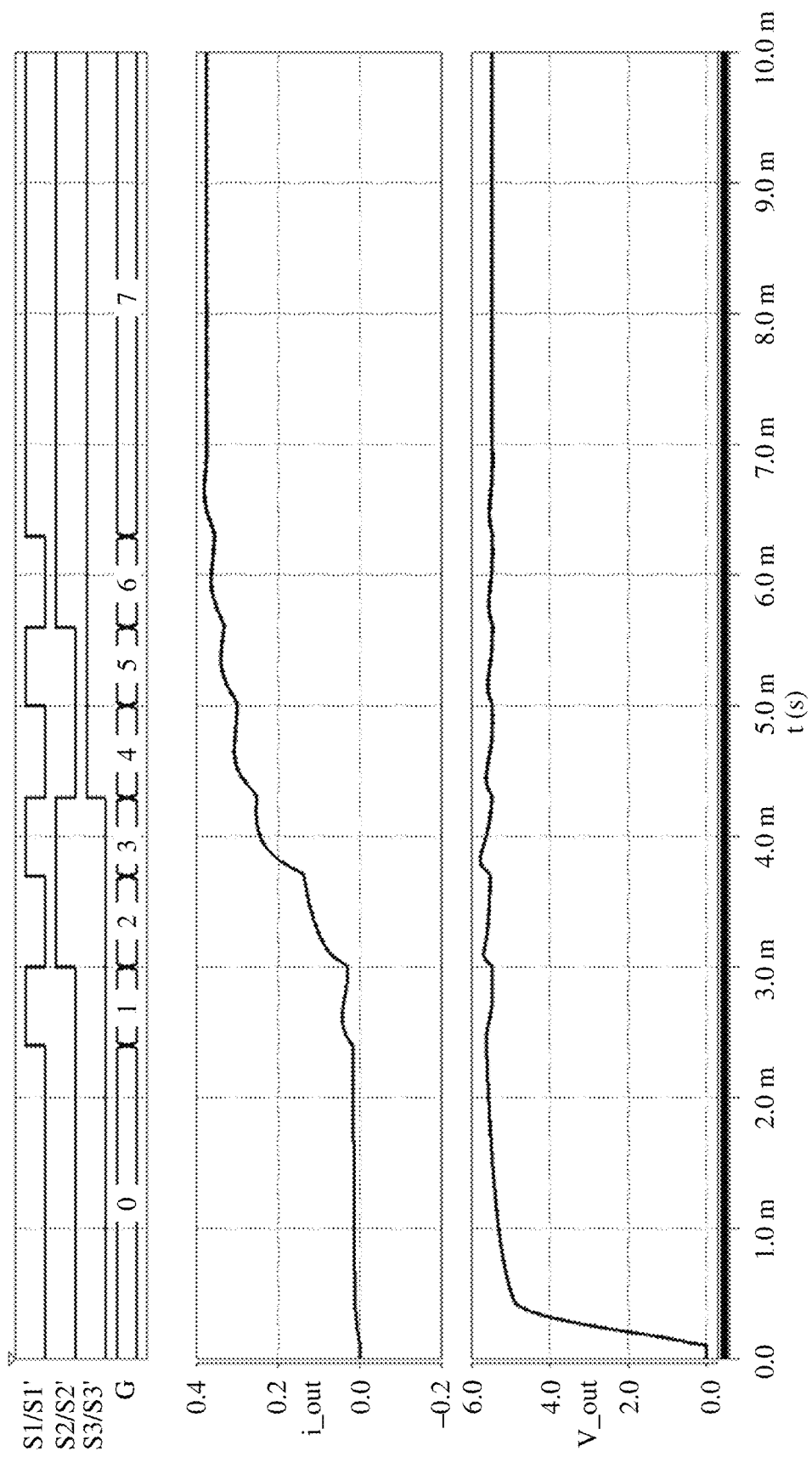
FIG. 14 is a schematic diagram of a relationship between a time sequence for driving controllable switch devices (for example, MOSFETs) and an output power of a wireless charging receiver circuit according to an embodiment of this application.

FIG. 14 is a schematic diagram of a relationship between a time sequence for driving controllable switch devices (for example, MOSFETs) and an output power of a wireless charging receiver circuit according to an embodiment of this application. A horizontal coordinate represents time in milliseconds (ms). S1/S1' represents a control time sequence of a first controllable switch device S1 and a second controllable switch device S1' in a $1^{st}$ capacitor-switch network, S2/S2' represents a control time sequence of a first controllable switch device S2 and a second controllable switch device S2' in a $2^{nd}$ capacitor-switch network, and S3/S3' represents a control time sequence of a first controllable switch device S3 and a second controllable switch device S3' in a $3^{rd}$ capacitor-switch network. Capacitance values of first capacitors or second capacitors in the $1^{st}$ capacitor-switch network to the $3^{rd}$ capacitor-switch network sequentially increase. G represents a decimal code corresponding to a binary code of S3/S3', S2/S2', and S1/S1'. S1/S1' corresponds to the least significant bit of a binary code, and S3/S3' corresponds to the most significant bit of the binary code. For example, assuming that S3/S3' is 1, S2/S2' is 0, and S1/S1' is 1, a binary code is 101, and a corresponding decimal code G is 5. V_out represents a voltage output by the wireless charging receiver circuit, and i_out represents a current output by the wireless charging receiver circuit. This control manner is as follows: A controller controls, in a minimum capacitance step mode (a binary form), an output end to output a first level or a second level.

It can be learned from FIG. 14 that, when the wireless charging receiver circuit normally operates, V_out can remain stable at about 5.5 V. A value of G gradually increases over time, a capacitance value of a parallel resonant capacitor connected to the wireless charging receiver circuit gradually increases over time, and i_out gradually increases over time. When V_out is stable, the output power of the wireless charging receiver circuit also gradually increases.

The foregoing circuit structure in this application may further normally operate during deviation, normally start during deviation, provide compatibility for devices at different operating frequencies, and the like.

Figure 15:
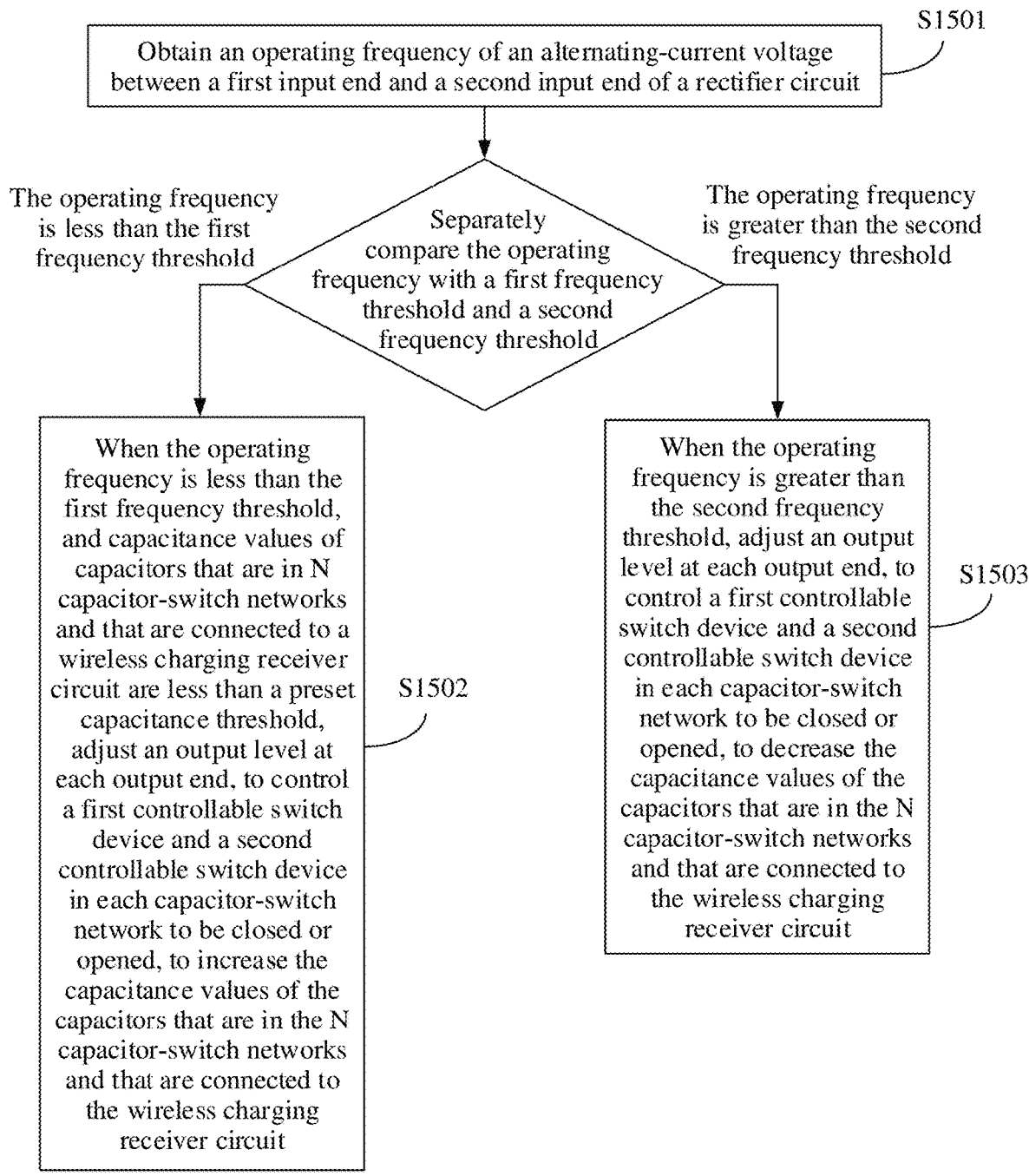
FIG. 15 is a schematic flowchart of a control method according to an embodiment of this application.

An embodiment of this application provides a control method. The control method is applied to the wireless charging receiver circuit. As shown in FIG. 15, the method includes the following operations.

S1501: Obtain an operating frequency of an alternating-current voltage between a first input end and a second input end of a rectifier circuit.

S1502: When the operating frequency is less than a first frequency threshold, and a total value of capacitance values of capacitors that are in N capacitor-switch networks and that are connected to the wireless charging receiver circuit are less than a preset capacitance threshold, adjust an output level at each output end, to control a first controllable switch device and a second controllable switch device in each capacitor-switch network to be closed or opened, to increase the total value of the capacitance values of the capacitors that are in the N capacitor-switch networks and that are connected to the wireless charging receiver circuit.

S1503: When the operating frequency is greater than a second frequency threshold, adjust an output level at each output end, to control a first controllable switch device and a second controllable switch device in each capacitor-switch network to be closed or opened, to decrease a total value of capacitance values of capacitors that are in the N capacitor-switch networks and that are connected to the wireless charging receiver circuit.

The first frequency threshold is less than or equal to the second frequency threshold.

Figure 16A:
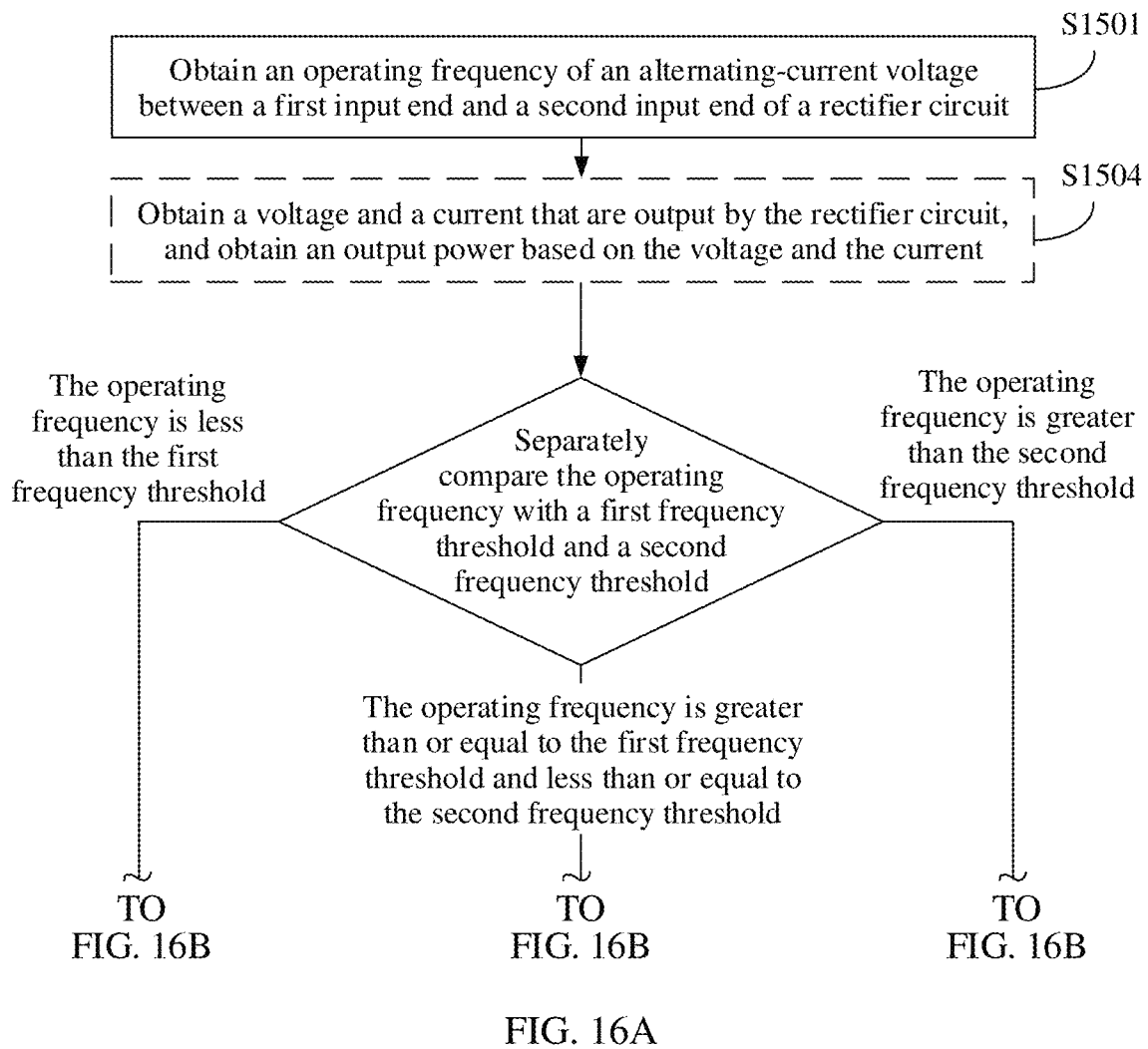
FIG. 16A and FIG. 16B are a schematic flowchart of a control method according to an embodiment of this application.
Figure 16B:
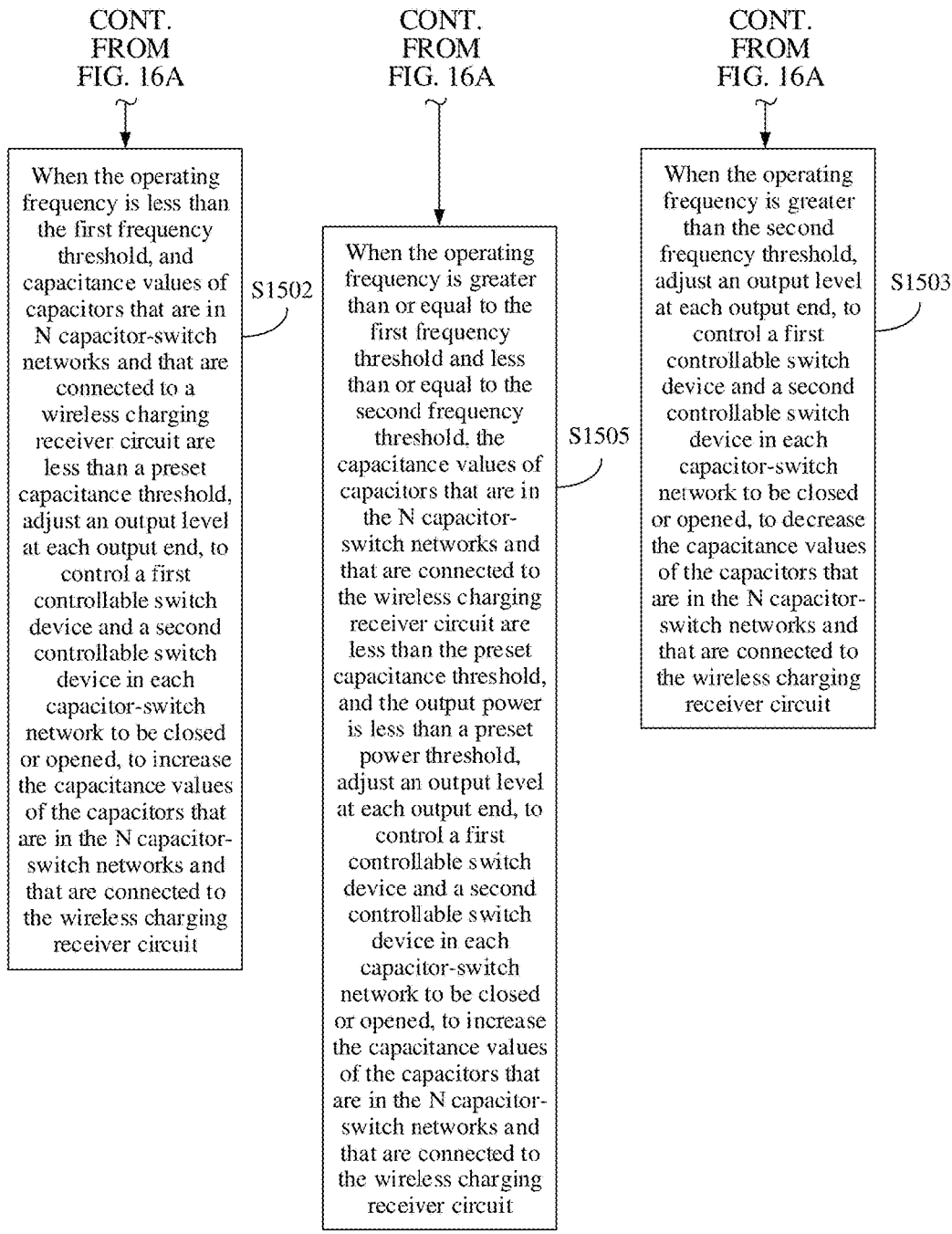

In an embodiment, as shown in FIG. 16A and FIG. 16B, the method may further include the following operations.

S1504: Obtain a voltage and a current that are output by the rectifier circuit, and obtain an output power based on the voltage and the current.

S1505: When the operating frequency is greater than or equal to the first frequency threshold and less than or equal to the second frequency threshold, the total value of the capacitance values of the capacitors that are in the N capacitor-switch networks and that are connected to the wireless charging receiver circuit are less than the preset capacitance threshold, and the output power is less than a preset power threshold, adjust an output level at each output end, to control a first controllable switch device and a second controllable switch device in each capacitor-switch network to be closed or opened, to increase the total value of the capacitance values of the capacitors that are in the N capacitor-switch networks and that are connected to the wireless charging receiver circuit.

For details of the control method, refer to the foregoing content of the controller. Details are not described herein again.

An embodiment of this application further provides a control apparatus. The control apparatus may be configured to perform a function of the controller in the foregoing embodiments. In the embodiments of this application, the control apparatus may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in this application, division into the modules is an example and merely logical function division, and may be other division in an embodiment.

Figure 17:
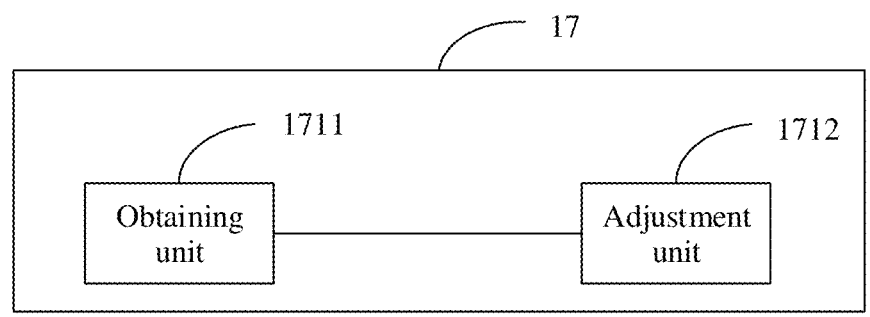
FIG. 17 is a schematic structural diagram of a control apparatus according to an embodiment of this application.

When each functional module is obtained through division based on each corresponding function, FIG. 17 is a schematic diagram of a possible structure of the control apparatus in the foregoing embodiment. A control apparatus 17 may include an obtaining unit 1711 and an adjustment unit 1712. The foregoing units are configured to support the control apparatus to perform the related method in either of FIG. 15 and FIG. 16A and FIG. 16B. The control apparatus provided in this application is configured to perform a function of the controller. Therefore, for corresponding features of the control apparatus and beneficial effects that can be achieved by the control apparatus, refer to the beneficial effects described in the foregoing corresponding embodiments. Details are not described herein again.

For example, the obtaining unit 1711 is configured to support the control apparatus 17 to perform the process S1501 in FIG. 15, or the processes S1501 and S1504 in FIG. 16A and FIG. 16B. The adjustment unit 1712 is configured to support the control apparatus 17 to perform the processes S1502 and S1503 in FIG. 15, or the processes S1502, S1503, and S1505 in FIG. 16A and FIG. 16B. All related content of the operations in the foregoing method embodiments may be cited in function descriptions of corresponding functional modules. Details are not described herein again.

In an embodiment, the obtaining unit 1711 is configured to obtain an operating frequency of an alternating-current voltage between a first input end and a second input end of a rectifier circuit.

When the operating frequency is less than a first frequency threshold, and a total value of capacitance values of capacitors that are in N capacitor-switch networks and that are connected to a wireless charging receiver circuit are less than a preset capacitance threshold, the adjustment unit 1712 is configured to adjust an output level at each output end, to control a first controllable switch device and a second controllable switch device in each capacitor-switch network to be closed or opened, to increase the total value of the capacitance values of the capacitors that are in the N capacitor-switch networks and that are connected to the wireless charging receiver circuit.

When the operating frequency is greater than a second frequency threshold, the adjustment unit 1712 is further configured to adjust an output level at each output end, to control a first controllable switch device and a second controllable switch device in each capacitor-switch network to be closed or opened, to decrease a total value of capacitance values of a capacitors that are in the N capacitor-switch networks and that are connected to the wireless charging receiver circuit. The first frequency threshold is less than or equal to the second frequency threshold.

In an embodiment, the obtaining unit 1711 is further configured to obtain a voltage and a current that are output by the rectifier circuit, and obtain an output power based on the voltage and the current.

When the operating frequency is greater than or equal to the first frequency threshold and less than or equal to the second frequency threshold, the total value of the capacitance values of the capacitors that are in the N capacitor-switch networks and that are connected to the wireless charging receiver circuit are less than the preset capacitance threshold, and the output power is less than a preset power threshold, the adjustment unit 1712 is further configured to adjust an output level at each output end, to control a first controllable switch device and a second controllable switch device in each capacitor-switch network to be closed or opened, to increase the total value of the capacitance values of the capacitors that are in the N capacitor-switch networks and that are connected to the wireless charging receiver circuit.

Figure 18:
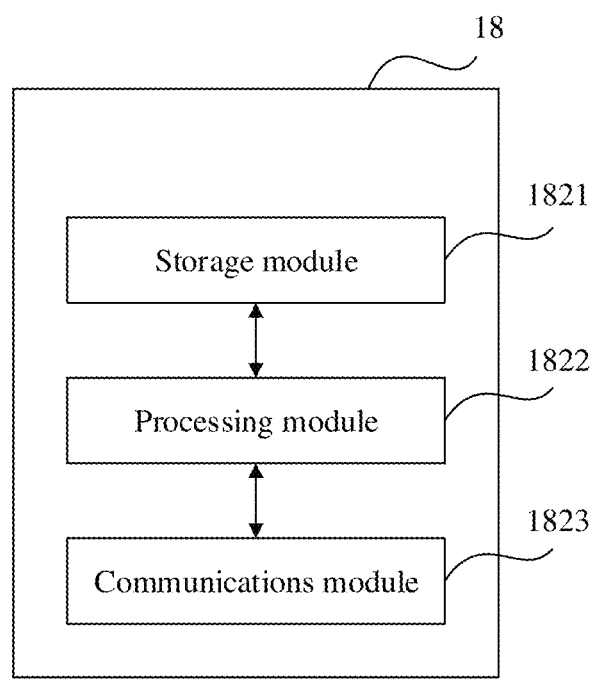
FIG. 18 is a schematic structural diagram of a control apparatus according to an embodiment of this application.

FIG. 18 is a schematic diagram of another possible structure of the control apparatus in the foregoing embodiment. A control apparatus 18 includes a processing module 1822 and a communications module 1823. In an embodiment, the control apparatus 18 may further include a storage module 1821. The foregoing modules are configured to support the control apparatus to perform the related method in either of FIG. 15 and FIG. 16A and FIG. 16B.

In an embodiment, the processing module 1822 is configured to control and manage an action of the control apparatus 18 or perform a corresponding processing function, for example, perform functions of the obtaining unit 1711 and the adjustment unit 1712. The communications module 1823 is configured to support the control apparatus 18 to communicate with another device. The storage module 1821 is configured to store program code and/or data of the control apparatus.

The processing module 1822 may be a processor or a controller, such as a central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The processing module 1822 may implement or execute various example logical blocks, modules, and circuits described with reference to content disclosed in this application. The processor may be a combination of processors implementing a computing function, for example, a combination of one or more microprocessors, or a combination of a DSP and a microprocessor. The communications module 1823 may be a network interface, a communications interface, or the like. The storage module 1821 may be a memory.

In an embodiment, the processing module 1822 may be the processor 980 in FIG. 9, the communications module 1823 may be the RF circuit 910 in FIG. 9, and the storage module 1821 may be the memory 920 in FIG. 9. One or more programs are stored in the memory. The one or more programs include an instruction. When the instruction is executed by the control apparatus, the control apparatus is enabled to perform the related method in either of FIG. 15 and FIG. 16A and FIG. 16B.

An embodiment of this application further provides a control apparatus, including a processor and a memory. The memory is configured to store a program. The processor invokes the program stored in the memory, to enable the control apparatus to perform the related method in either of FIG. 15 and FIG. 16A and FIG. 16B.

An embodiment of this application further provides a computer storage medium that stores one or more programs. The computer storage medium stores a computer program. When the computer program is executed by a processor, a control apparatus is enabled to perform the related method in either of FIG. 15 and FIG. 16A and FIG. 16B.

An embodiment of this application further provides a computer program product including an instruction. When the computer program product runs on a control apparatus, the control apparatus is enabled to perform the related method in either of FIG. 15 and FIG. 16A and FIG. 16B.

An embodiment of this application provides a chip system. The chip system includes a processor, configured to support a control apparatus to perform the related method in either of FIG. 15 and FIG. 16A and FIG. 16B. In an embodiment, the chip system further includes a memory. The memory is configured to store a program instruction and data that are necessary for a terminal device. The chip system may include a chip and an integrated circuit, or may include a chip and another discrete device. This is not specifically limited in the embodiments of this application.

The control apparatus, the computer storage medium, the computer program product, and the chip system provided in this application are all configured to perform the foregoing control method performed by the controller. Therefore, for beneficial effects that can be achieved by the control apparatus, the computer storage medium, the computer program product, and the chip system, refer to beneficial effects in the foregoing embodiments. Details are not described herein again.

It should be understood that sequence numbers of the foregoing processes do not mean execution sequences in the embodiments of this application. The execution sequences of the processes should be determined according to functions and internal logic of the processes, and should not be construed as any limitation on the embodiments of this application.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the embodiment goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, device, and method may be implemented in other manners. For example, the described device embodiment is merely an example. For example, division into the units is merely logical function division and may be other division in an embodiment. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on requirements to achieve the objectives of the solutions of the embodiments.

In addition, functional units in the embodiments of this application may be integrated into one processing unit, or each of the units may exist alone physically, or two or more units may be integrated into one unit.

All or some of the foregoing embodiments may be implemented by software, hardware, firmware, or any combination thereof. When a software program is used to implement the embodiments, the embodiments may be implemented all or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless charging receiver circuit, comprising:
   N capacitor-switch networks;
   a rectifier circuit; and
   a controller, wherein
   N is an integer greater than or equal to 1; and a first end of each capacitor-switch network is connected to a first input end of the rectifier circuit, and a second end of each capacitor-switch network is connected to a second input end of the rectifier circuit;
   each capacitor-switch network comprises a first capacitor, a second capacitor, a first controllable switch device, a second controllable switch device, and a ground point, wherein the first capacitor located on one side of the ground point is connected in series to the first controllable switch device, and the second capacitor located on the other side of the ground point is connected in series to the second controllable switch device; and in a same capacitor-switch network, a capacitance value of the first capacitor is equal to a capacitance value of the second capacitor;
   the controller comprises N output ends, wherein the N output ends one-to-one correspond to the N capacitor-switch networks, and each output end is configured to be connected to a control end of the first controllable switch device in a corresponding capacitor-switch network and a control end of the second controllable switch device in the corresponding capacitor-switch network; and
   the controller is configured to:
      obtain an operating frequency of an alternating-current voltage between the first input end and the second input end of the rectifier circuit; and
      when the operating frequency is less than a first frequency threshold, and a total value of capacitance values of capacitors that are in the N capacitor-switch networks and that are connected to the wireless charging receiver circuit are less than a preset capacitance threshold, adjust an output level at each output end, to control the first controllable switch device and the second controllable switch device in each capacitor-switch network to be closed or opened, to increase the total value of the capacitance values of the capacitors that are in the N capacitor-switch networks and that are connected to the wireless charging receiver circuit; or
      when the operating frequency is greater than a second frequency threshold, adjust an output level at each output end, to control the first controllable switch device and the second controllable switch device in each capacitor-switch network to be closed or opened, to decrease a total value of capacitance values of capacitors that are in the N capacitor-switch networks and that are connected to the wireless charging receiver circuit, wherein the first frequency threshold is less than or equal to the second frequency threshold.

2. The wireless charging receiver circuit according to claim 1, wherein the controller is further configured to:
   obtain a voltage and a current that are output by the rectifier circuit, and obtain an output power based on the voltage and the current; and
   when the operating frequency is greater than or equal to the first frequency threshold and less than or equal to the second frequency threshold, the total value of the capacitance values of the capacitors that are in the N capacitor-switch networks and that are connected to the wireless charging receiver circuit are less than the preset capacitance threshold, and the output power is less than a preset power threshold, adjust an output level at each output end, to control the first controllable switch device and the second controllable switch device in each capacitor-switch network to be closed or opened, to increase the total value of the capacitance values of the capacitors that are in the N capacitor-switch networks and that are connected to the wireless charging receiver circuit.

3. The wireless charging receiver circuit according to claim 1, wherein a capacitance value of a first capacitor in an $(i+1)^{th}$ capacitor-switch network is K times a capacitance value of a first capacitor in an $i^{th}$ capacitor-switch network, wherein i is an integer, $1 \leq i \leq N-1$, and $1 \leq K \leq 10$.

4. The wireless charging receiver circuit according to claim 1, wherein the circuit further comprises a secondary coil and a secondary series resonant capacitor, wherein a first end of the secondary coil is connected to a first end of the secondary series resonant capacitor, a second end of the secondary series resonant capacitor is connected to first ends of the N capacitor-switch networks and the first input end of the rectifier circuit, and a second end of the secondary coil is connected to second ends of the N capacitor-switch networks and the second input end of the rectifier circuit.

5. The wireless charging receiver circuit according to claim 1, further comprising a first filter capacitor, wherein a first output end of the rectifier circuit is connected to a first end of the first filter capacitor, and a second output end of the rectifier circuit is connected to a second end of the first filter capacitor.

6. The wireless charging receiver circuit according to claim 5, further comprising a direct-current/direct-current voltage step-down circuit, wherein
the first end of the first filter capacitor is connected to a first input end of the direct-current/direct-current voltage step-down circuit, the second end of the first filter capacitor is connected to a second input end of the direct-current/direct-current (DC/DC) voltage step-down circuit, a first output end of the DC/DC voltage step-down circuit is connected to a first end of a load, and a second output end of the DC/DC voltage step-down circuit is connected to a second end of the load; and the DC/DC voltage step-down circuit is configured to decrease a voltage between the two ends of the first filter capacitor.

7. The wireless charging receiver circuit according to claim 1, further comprising a first resistor and a second resistor, wherein
a first end of the first resistor is connected to a first output end of the rectifier circuit, a second end of the first resistor is connected to a first end of the second resistor, a second end of the second resistor is connected to a second output end of the rectifier circuit, and the first end of the second resistor is connected to a first input end of the controller; and the first resistor and the second resistor are configured to measure a voltage output by the rectifier circuit.

8. The wireless charging receiver circuit according to claim 6, further comprising a current sampling apparatus, wherein
the current sampling apparatus is located on a positive end or a ground end between the first filter capacitor and the DC/DC voltage step-down circuit, and the current sampling apparatus is connected to a second input end of the controller, and configured to measure a current output by the rectifier circuit.

9. The wireless charging receiver circuit according to claim 6, further comprising a second filter capacitor, wherein
a first end of the second filter capacitor is connected between the first output end of the DC/DC voltage step-down circuit and the first end of the load, and a second end of the second filter capacitor is connected between the second output end of the DC/DC voltage step-down circuit and the second end of the load.

10. A control method comprising:
providing a wireless charging receiver circuit comprising:
N capacitor-switch networks;
a rectifier circuit; and
a controller, wherein
N is an integer greater than or equal to 1, and a first end of each capacitor-switch network is connected to a first input end of the rectifier circuit, and a second end of each capacitor-switch network is connected to a second input end of the rectifier circuit;
each capacitor-switch network comprises a first capacitor, a second capacitor, a first controllable switch device, a second controllable switch device, and a ground point, wherein the first capacitor located on one side of the ground point is connected in series to the first controllable switch device, and the second capacitor located on the other side of the ground point is connected in series to the second controllable switch device; and in a same capacitor-switch network, a capacitance value of the first capacitor is equal to a capacitance value of the second capacitor; and
the controller comprises N output ends, wherein the N output ends one-to-one correspond to the N capacitor-switch networks, and each output end is configured to be connected to a control end of the first controllable switch device in a corresponding capacitor-switch network and a control end of the second controllable switch device in the corresponding capacitor-switch network;
obtaining an operating frequency of an alternating-current voltage between the first input end and the second input end of the rectifier circuit; and
when the operating frequency is less than a first frequency threshold, and capacitance values of capacitors that are in N capacitor-switch networks and that are connected to the wireless charging receiver circuit are less than a preset capacitance threshold, adjusting an output level at each output end, to control the first controllable switch device and the second controllable switch device in each capacitor-switch network to be closed or opened, to increase the capacitance values of the capacitors that are in the N capacitor-switch networks and that are connected to the wireless charging receiver circuit; or
when the operating frequency is greater than a second frequency threshold, adjusting the output level at each output end, to control the first controllable switch device and the second controllable switch device in each capacitor-switch network to be closed or opened, to decrease capacitance values of capacitors that are in the N capacitor-switch networks and that are connected to the wireless charging receiver circuit, wherein the first frequency threshold is less than or equal to the second frequency threshold.

11. The method according to claim 10, further comprising:
obtaining a voltage and a current that are output by the rectifier circuit, and obtaining an output power based on the voltage and the current; and
when the operating frequency is greater than or equal to the first frequency threshold and less than or equal to the second frequency threshold, the capacitance values of the capacitors that are in the capacitor-switch networks and that are connected to the wireless charging receiver circuit are less than the preset capacitance threshold, and the output power is less than a preset power threshold, adjusting an output level at each output end, to control the first controllable switch device and the second controllable switch device in each capacitor-switch network to be closed or opened, to increase the capacitance values of the capacitors that are in the N capacitor-switch networks and that are connected to the wireless charging receiver circuit.

12. A control apparatus, comprising:
an obtaining unit, configured to obtain an operating frequency of an alternating-current voltage between a first input end and a second input end of a rectifier circuit; and
an adjustment unit, configured to: when the operating frequency is less than a first frequency threshold, and capacitance values of capacitors that are in N capacitor-switch networks and that are connected to a wireless charging receiver circuit are less than a preset capacitance threshold, adjust an output level at each output end, to control a first controllable switch device and a second controllable switch device in each capacitor-switch network to be closed or opened, to increase the capacitance values of the capacitors that are in the N capacitor-switch networks and that are connected to the wireless charging receiver circuit; or
when the operating frequency is greater than a second frequency threshold, adjust an output level at each output end, to control the first controllable switch device and the second controllable switch device in each capacitor-switch network to be closed or opened, to decrease capacitance values of capacitors that are in the N capacitor-switch networks and that are connected to the wireless charging receiver circuit, wherein the first frequency threshold is less than or equal to the second frequency threshold.

13. The control apparatus according to claim 12, wherein the obtaining unit is further configured to obtain a voltage and a current that are output by the rectifier circuit, and obtain an output power based on the voltage and the current; and
when the operating frequency is greater than or equal to the first frequency threshold and less than or equal to the second frequency threshold, the capacitance values of the capacitors that are in the capacitor-switch networks and that are connected to the wireless charging receiver circuit are less than the preset capacitance threshold, and the output power is less than a preset power threshold, the adjustment unit is further configured to adjust an output level at each output end, to control a first controllable switch device and a second controllable switch device in each capacitor-switch network to be closed or opened, to increase the capacitance values of the capacitors that are in the N capacitor-switch networks and that are connected to the wireless charging receiver circuit.

14. A terminal device, comprising:
a wireless charging receiver circuit; wherein the wireless charging receiver circuit comprises:
N capacitor-switch networks;
a rectifier circuit; and
a controller, wherein
N is an integer greater than or equal to 1; and a first end of each capacitor-switch network is connected to a first input end of the rectifier circuit, and a second end of each capacitor-switch network is connected to a second input end of the rectifier circuit;
each capacitor-switch network comprises a first capacitor, a second capacitor, a first controllable switch device, a second controllable switch device, and a ground point, wherein the first capacitor located on one side of the ground point is connected in series to the first controllable switch device, and the second capacitor located on the other side of the ground point is connected in series to the second controllable switch device; and in a same capacitor-switch network, a capacitance value of a first capacitor is equal to a capacitance value of a second capacitor;
the controller comprises N output ends, wherein the N output ends one-to-one correspond to the N capacitor-switch networks, and each output end is configured to be connected to a control end of a first controllable switch device in a corresponding capacitor-switch network and a control end of a second controllable switch device in the corresponding capacitor-switch network; and
the controller is configured to:
obtain an operating frequency of an alternating-current voltage between the first input end and the second input end of the rectifier circuit; and
when the operating frequency is less than a first frequency threshold, and a total value of capacitance values of capacitors that are in the N capacitor-switch networks and that are connected to the wireless charging receiver circuit are less than a preset capacitance threshold, adjust an output level at each output end, to control the first controllable switch device and the second controllable switch device in each capacitor-switch network to be closed or opened, to increase the total value of the capacitance values of the capacitors that are in the N capacitor-switch networks and that are connected to the wireless charging receiver circuit; or
when the operating frequency is greater than a second frequency threshold, adjust an output level at each output end, to control the first controllable switch device and the second controllable switch device in each capacitor-switch network to be closed or opened, to decrease a total value of capacitance values of capacitors that are in the N capacitor-switch networks and that are connected to the wireless charging receiver circuit, wherein the first frequency threshold is less than or equal to the second frequency threshold.

15. The terminal device according to claim 14, wherein the controller is further configured to:
obtain a voltage and a current that are output by the rectifier circuit, and obtain an output power based on the voltage and the current; and
when the operating frequency is greater than or equal to the first frequency threshold and less than or equal to the second frequency threshold, the total value of the capacitance values of the capacitors that are in the N capacitor-switch networks and that are connected to the wireless charging receiver circuit are less than the preset capacitance threshold, and the output power is less than a preset power threshold, adjust an output level at each output end, to control the first controllable switch device and the second controllable switch device in each capacitor-switch network to be closed or opened, to increase the total value of the capacitance values of the capacitors that are in the N capacitor-switch networks and that are connected to the wireless charging receiver circuit.

16. The terminal device according to claim 14, wherein a capacitance value of a first capacitor in an $(i+1)^{th}$ capacitor-switch network is K times a capacitance value of a first capacitor in an $i^{th}$ capacitor-switch network, wherein i is an integer, $1 \le i \le N-1$, and $1 \le K \le 10$.

17. The terminal device according to claim 14, wherein the circuit further comprises a secondary coil and a secondary series resonant capacitor, wherein a first end of the secondary coil is connected to a first end of the secondary series resonant capacitor, a second end of the secondary series resonant capacitor is connected to first ends of the N capacitor-switch networks and the first input end of the rectifier circuit, and a second end of the secondary coil is connected to second ends of the N capacitor-switch networks and the second input end of the rectifier circuit.

18. A wireless charging system, comprising:
a wireless charging transmitter circuit; and
a wireless charging receiver circuit, wherein energy is transmitted between the wireless charging receiver circuit and the wireless charging transmitter circuit through magnetic induction;
wherein the wireless charging receiver circuit comprises N capacitor-switch networks, a rectifier circuit, and a controller, wherein N is an integer greater than or equal to 1; and a first end of each capacitor-switch network is connected to a first input end of the rectifier circuit, and a second end of each capacitor-switch network is connected to a second input end of the rectifier circuit;
each capacitor-switch network comprises a first capacitor, a second capacitor, a first controllable switch device, a second controllable switch device, and a ground point, wherein the first capacitor located on one side of the ground point is connected in series to the first controllable switch device, and the second capacitor located on the other side of the ground point is connected in series to the second controllable switch device; and in a same capacitor-switch network, a capacitance value of the first capacitor is equal to a capacitance value of the second capacitor;
the controller comprises N output ends, wherein the N output ends one-to-one correspond to the N capacitor-switch networks, and each output end is configured to be connected to a control end of a first controllable switch device in a corresponding capacitor-switch network and a control end of a second controllable switch device in the corresponding capacitor-switch network; and the controller is configured to:
obtain an operating frequency of an alternating-current voltage between the first input end and the second input end of the rectifier circuit; and
when the operating frequency is less than a first frequency threshold, and a total value of capacitance values of capacitors that are in the N capacitor-switch networks and that are connected to the wireless charging receiver circuit are less than a preset capacitance threshold, adjust an output level at each output end, to control the first controllable switch device and the second controllable switch device in each capacitor-switch network to be closed or opened, to increase the total value of the capacitance values of the capacitors that are in the N capacitor-switch networks and that are connected to the wireless charging receiver circuit; or
when the operating frequency is greater than a second frequency threshold, adjust an output level at each output end, to control the first controllable switch device and the second controllable switch device in each capacitor-switch network to be closed or opened, to decrease a total value of capacitance values of capacitors that are in the N capacitor-switch networks and that are connected to the wireless charging receiver circuit, wherein the first frequency threshold is less than or equal to the second frequency threshold.

19. The wireless charging system according to claim 18, wherein the controller is further configured to:
obtain a voltage and a current that are output by the rectifier circuit, and obtain an output power based on the voltage and the current; and
when the operating frequency is greater than or equal to the first frequency threshold and less than or equal to the second frequency threshold, the total value of the capacitance values of the capacitors that are in the N capacitor-switch networks and that are connected to the wireless charging receiver circuit are less than the preset capacitance threshold, and the output power is less than a preset power threshold, adjust an output level at each output end, to control the first controllable switch device and the second controllable switch device in each capacitor-switch network to be closed or opened, to increase the total value of the capacitance values of the capacitors that are in the N capacitor-switch networks and that are connected to the wireless charging receiver circuit.

20. The wireless charging system according to claim 18, wherein a capacitance value of a first capacitor in an $(i+1)^{th}$ capacitor-switch network is K times a capacitance value of a first capacitor in an $i^{th}$ capacitor-switch network, wherein i is an integer, $1 \le i \le N-1$, and $1 \le K \le 10$.

* * * * *